(12) United States Patent
Yamauchi et al.

(10) Patent No.: US 11,196,048 B2
(45) Date of Patent: Dec. 7, 2021

(54) POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY CONTAINING THE POSITIVE ELECTRODE ACTIVE MATERIAL

(71) Applicant: SUMITOMO METAL MINING CO., LTD., Tokyo (JP)

(72) Inventors: Mitsuru Yamauchi, Niihama (JP); Tetsufumi Komukai, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 44 days.

(21) Appl. No.: 16/332,087

(22) PCT Filed: Sep. 13, 2017

(86) PCT No.: PCT/JP2017/033117
§ 371 (c)(1),
(2) Date: May 21, 2019

(87) PCT Pub. No.: WO2018/052038
PCT Pub. Date: Mar. 22, 2018

(65) Prior Publication Data
US 2020/0127287 A1    Apr. 23, 2020

(30) Foreign Application Priority Data

Sep. 13, 2016   (JP) .............................. JP2016-178217

(51) Int. Cl.
*H01M 4/525*   (2010.01)
*H01M 4/505*   (2010.01)
(Continued)

(52) U.S. Cl.
CPC ........... *H01M 4/525* (2013.01); *C01B 35/128* (2013.01); *H01M 4/366* (2013.01); *H01M 4/505* (2013.01);
(Continued)

(58) Field of Classification Search
CPC ...... H01M 4/366; H01M 4/505; H01M 4/525; H01M 2004/028; C01B 35/128; C01P 2004/03; C01P 2004/61; C01P 2004/62
See application file for complete search history.

(56) References Cited

U.S. PATENT DOCUMENTS

| 7,998,619 B2 | 8/2011 | Kikuchi et al. |
| 2001/0010807 A1* | 8/2001 | Matsubara ............. C01G 53/42 423/277 |

(Continued)

FOREIGN PATENT DOCUMENTS

| JP | 2004-335278 A | 11/2004 |
| JP | 2005-251716 A | 9/2005 |

(Continued)

OTHER PUBLICATIONS

Extended (Supplementary) European Search Report dated Apr. 22, 2020, issued in counterpart EP Application No. 17850939.4. (8 pages).

(Continued)

*Primary Examiner* — Osei K Amponsah
(74) *Attorney, Agent, or Firm* — Westerman, Hattori, Daniels & Adrian, LLP

(57) ABSTRACT

Provided is a positive electrode active material that has high output characteristics and battery capacity when used for a positive electrode of a nonaqueous electrolyte secondary battery and can inhibit gelation of positive electrode mixture paste. A method for producing the positive electrode active material is also provided. A positive electrode active mate- (Continued)

rial for a nonaqueous electrolyte secondary battery contains a lithium-nickel-cobalt-manganese composite oxide represented by General Formula (1): $Li_{1+s}Ni_xCo_yMn_zB_tM1_uO_{2+\beta}$ and having a hexagonal layered crystal structure. The lithium-nickel-cobalt-manganese composite oxide contains a secondary particle formed of a plurality of flocculated primary particles and a boron compound containing lithium present at least on part of surfaces of the primary particles. A water-soluble Li amount present on the surfaces of the primary particles is up to 0.1% by mass relative to the entire amount of the positive electrode active material.

11 Claims, 8 Drawing Sheets

(51) Int. Cl.
    *H01M 4/36*     (2006.01)
    *C01B 35/12*     (2006.01)
    *H01M 4/02*     (2006.01)

(52) U.S. Cl.
    CPC ...... *C01P 2004/03* (2013.01); *C01P 2004/61* (2013.01); *C01P 2004/62* (2013.01); *H01M 2004/028* (2013.01)

(56) References Cited

U.S. PATENT DOCUMENTS

| | | | |
|---|---|---|---|
| 2005/0142442 A1 | 6/2005 | Yuasa et al. | |
| 2008/0118837 A1 | 5/2008 | Shirane et al. | |
| 2013/0277604 A1 | 10/2013 | Shimokita et al. | |
| 2014/0011090 A1 | 1/2014 | Toya et al. | |
| 2014/0377660 A1* | 12/2014 | Fukui | C01G 53/42 429/223 |
| 2015/0010819 A1* | 1/2015 | Lee | H01M 4/505 429/221 |
| 2015/0108397 A1* | 4/2015 | Takeoka | C01G 53/50 252/182.1 |
| 2016/0181605 A1 | 6/2016 | Li et al. | |
| 2016/0301063 A1 | 10/2016 | Yukinobu et al. | |
| 2017/0187065 A1 | 6/2017 | Inoue et al. | |

FOREIGN PATENT DOCUMENTS

| | | |
|---|---|---|
| JP | 2006-294469 A | 10/2006 |
| JP | 2009-146739 A | 7/2009 |
| JP | 2010-040382 A | 2/2010 |
| JP | 2011-108554 A | 6/2011 |
| JP | 2013-239434 A | 11/2013 |
| JP | 2015-099767 A | 5/2015 |
| JP | 2015-225741 A | 12/2015 |
| WO | 2012/131881 A1 | 10/2012 |
| WO | 2015/072359 A1 | 5/2015 |

OTHER PUBLICATIONS

International Search Report dated Dec. 12, 2017, issued in counterpart Application No. PCT/JP2017/033117, with English translation. (12 pages).

Notification of Transmittal of Translation of the International Preliminary Report on Patentabililty (Form PCT/IB/338) issued in counterpart International Application No. PCT/JP2017/033117 dated Mar. 28, 2019 with Forms PCT/IB/373 and PCT/ISA/237. (11 pages).

\* cited by examiner

POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY CONTAINING THE POSITIVE ELECTRODE ACTIVE MATERIAL

TECHNICAL FIELD

The present invention relates to a positive electrode active material for a nonaqueous electrolyte secondary battery, a method for producing the same, and a nonaqueous electrolyte secondary battery containing the positive electrode active material.

BACKGROUND ART

In recent years, with the proliferation of portable electronic equipment such as cellular phones and notebook personal computers, development of a nonaqueous electrolyte secondary battery with reduced size and weight having high energy density is intensely demanded. Development of a high output secondary battery is intensely demanded as a battery for electric vehicles including hybrid cars. Batteries for electric vehicles in particular are used in a wide temperature range from high temperature to extremely low temperature and thus require high output in such a wide temperature range.

Nonaqueous electrolyte secondary batteries such as lithium-ion secondary batteries are secondary batteries satisfying such a demand. A nonaqueous electrolyte secondary battery includes a negative electrode, a positive electrode, and an electrolyte solution; for active materials of the negative electrode and the positive electrode, materials that can de-insert and insert lithium are being used.

Among nonaqueous electrolyte secondary batteries, the research and development of which are currently energetically being conducted, nonaqueous electrolyte secondary batteries containing a layered or spinel type lithium-metal composite oxide as a positive electrode material can obtain as high voltage as 4 V class and are thus being practically used as batteries having high energy density.

For such a positive electrode material of nonaqueous electrolyte secondary batteries, lithium composite oxides are currently developed such as a lithium-cobalt composite oxide ($LiCoO_2$), which is relatively easily synthesized; a lithium-nickel composite oxide ($LiNiO_2$) and a lithium-nickel-cobalt-manganese composite oxide ($LiNi_{1/3}Co_{1/3}Mn_{1/3}O_2$) containing nickel, which is lower in price than cobalt; and a lithium-manganese composite oxide ($LiMn_2O_4$) and a lithium-nickel-manganese composite oxide ($LiNi_{0.5}Mn_{0.5}O_2$) containing manganese.

Among the positive electrode materials, in recent years, the lithium-nickel-cobalt-manganese composite oxide ($LiNi_{0.33}Co_{0.33}Mn_{0.33}O_2$), which is excellent in thermal stability and high in capacity, has received attention. The lithium-nickel-cobalt-manganese composite oxide is a layered compound like the lithium-cobalt composite oxide and the lithium-nickel composite oxide and contains nickel, cobalt, and manganese in transition metal sites basically with a composition ratio of 1:1:1.

By the way, there has been a problem in that when the ratio of cobalt decreases, output characteristics tend to degrade, and the lithium-nickel-cobalt-manganese composite oxide ($LiNi_{0.33}Co_{0.33}Mn_{0.33}O_2$) is higher in resistance and has difficulty in obtaining high output than the lithium-cobalt composite oxide ($LiCoO_2$). So far, there have been some presentations for improving battery characteristics by adding a compound containing boron or the like to the lithium-nickel-cobalt-manganese composite oxide.

Patent Literature 1 presents a positive electrode active material for a nonaqueous electrolyte secondary battery having at least a lithium-transition metal composite oxide with a layered structure, in which the lithium-transition metal composite oxide is present in the form of particles formed of either one or both of primary particles and a secondary particle as a flocculated body thereof, in which the aspect ratio of the primary particle is 1 to 1.8, and has a compound having at least one selected from the group consisting of molybdenum, vanadium, tungsten, boron, and fluorine at least on surfaces of the particles, for example. It is said that having the compound having at least one selected from the group consisting of molybdenum, vanadium, tungsten, boron, and fluorine on the surfaces of the particles improves conductivity.

Patent Literature 2 presents lithium-transition metal-based compound powder for a lithium secondary battery positive electrode material having a lithium-transition metal-based compound having a function of enabling insertion and de-insertion of lithium ions as a main component and formed by adding one compound containing at least one element selected from B and Bi and one compound containing at least one element selected from Mo, W, Nb, Ta, and Re in combination to the main component raw material and then firing the mixture. It is said that adding the additional elements in combination and then firing the mixture can obtain lithium-transition metal-based compound powder formed of fine particles in which particle growth and sintering are inhibited and obtain lithium-transition metal-based compound powder with improved rate and output characteristics and easy to handle and prepare an electrode.

Patent Literature 3 presents a positive electrode composition for a nonaqueous electrolyte solution secondary battery containing a lithium-transition metal composite oxide represented by a general formula $Li_aNi_{1-x-y}Co_xM^1_yM^2_zW_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$; $M^1$ is at least one selected from the group consisting of Mn and Al; and $M^2$ is at least one selected from the group consisting of Zr, Ti, Mg, Ta, Nb, and Mo) and a boron compound containing a boron element and an oxygen element. It is said that using a positive electrode composition containing the lithium-transition metal composite oxide essentially containing nickel and tungsten and a specific boron compound can improve output characteristics and cycle characteristics in the positive electrode composition containing the lithium-transition metal composite oxide.

Patent Literature 4 presents a positive electrode active material for a nonaqueous electrolyte solution secondary battery having at least a lithium-transition metal composite oxide with a layered structure, in which the lithium-transition metal composite oxide is formed of particles and has lithium borate at least on surfaces of the particles. It is said that having lithium borate on the surfaces of the particles can improve thermal stability while maintaining initial discharging capacity and initial efficiency at the same level.

Patent Literature 5 presents a method for producing a positive electrode active material having a process of covering composite oxide particles containing lithium (Li) and at least either nickel (Ni) or cobalt (Co) with at least either a sulfate or a boric acid compound and a process of heat-treating the composite oxide particles covered with at least either the sulfate or the boric acid compound in an oxidative atmosphere. It is said that this presentation can produce a positive electrode active material that can achieve higher capacity and improvement in charging/discharging efficiency in secondary batteries.

Patent Literature 6 presents a positive electrode active material obtained by covering composite oxide particles having average composition represented by $Li_aNi_xCo_yAl_zO_2$ (where Ni can be replaced with one or two or more metal elements selected from the group consisting of Mn, Cr, Fe, V, Mg, Ti, Zr, Nb, Mo, W, Cu, Zn, Ga, In, Sn, La, and Ce within a range of up to 0.1 of Ni when the amount of the entire Ni is 1; in the formula, a, x, y, and z are values within ranges of $0.3 \leq a \leq 1.05$, $0.60 < x < 0.90$, $0.10 < y < 0.40$, and $0.01 < z < 0.20$, respectively; and x, y, and z have a relation of $x+y+z=1$) with a boric acid compound and performing heat treatment thereon and having a carbonate ion content of up to 0.15% by weight and a borate ion content of at least 0.01% by weight and up to 5.0% by weight. It is said that covering with the boric acid compound replaces a carbonic acid group contained in the composite oxide particles with the boric acid compound and can reduce the amount of gas generated within a secondary battery.

Also presented is a technique that uses a positive electrode formed of particles having a uniform, appropriate particle diameter and having a hollow structure to obtain high performance (high cycle characteristics, low resistance, and high output) as a battery.

Patent Literature 7 presents a positive electrode active material for a nonaqueous electrolyte secondary battery formed of a lithium-nickel-manganese composite oxide represented by a general formula: $Li_{1+u}Ni_xMn_yCo_zM_tO_2$ ($-0.05 \leq u \leq 0.50$, $x+y+z+t=1$, $0.3 \leq x \leq 0.7$, $0.1 \leq y \leq 0.55$, $0 \leq z \leq 0.4$, and $0 \leq t \leq 0.1$; and M is an additional element and is one or more elements selected from Mg, Ca, Al, Ti, V, Cr, Zr, Nb, Mo, and W) and formed of a hexagonal lithium-containing composite oxide having a layered structure and including a hollow structure including a shell part formed of sintered flocculated primary particles having an average particle diameter of 2 to 8 μm and [(d90−d10)/the average particle diameter] as an indicator indicating a spread of particle size distribution of up to 0.60 and a hollow part present therewithin, for example. It is said that this positive electrode active material is high in capacity and favorable in cycle characteristics and enables high output when used for nonaqueous secondary batteries.

CITATION LIST

Patent Literature

[Patent Literature 1] Japanese Unexamined Patent Application Publication No. 2005-251716
[Patent Literature 2] Japanese Unexamined Patent Application Publication No. 2011-108554
[Patent Literature 3] Japanese Unexamined Patent Application Publication No. 2013-239434
[Patent Literature 4] Japanese Unexamined Patent Application Publication No. 2004-335278
[Patent Literature 5] Japanese Unexamined Patent Application Publication No. 2009-146739
[Patent Literature 6] Japanese Unexamined Patent Application Publication No. 2010-040382
[Patent Literature 7] International Publication No. 2012/131881

SUMMARY OF INVENTION

Technical Problem

Although it is said that the above presentations all improve battery characteristics such as output characteristics, addition of boron may cause a problem of gelation of a positive electrode mixture paste during electrode production, and remedy for gelation is demanded as well as improvement in battery characteristics such as output characteristics and battery capacity.

The present invention has been made in view of these circumstances, and an object thereof is to provide a positive electrode active material that improves output characteristics and battery capacity when used for a nonaqueous electrolyte secondary battery and inhibits gelation of a positive electrode mixture paste during electrode production. Another object of the present invention is to provide a method that can produce such a positive electrode active material easily in production on an industrial scale.

Solution to Problem

The inventors of the present invention intensively studied to solve the above problems and have found out that a specific amount of a boron compound is made present on surfaces of primary particles of a lithium-nickel-cobalt-manganese composite oxide forming a positive electrode active material, and a water-soluble Li amount present on the surfaces of the primary particles is set to a specific range, whereby both improvement in the output characteristics and the battery capacity of a secondary battery containing this positive electrode active material in its positive electrode and inhibition of gelation of a positive electrode mixture paste can be achieved to complete the present invention.

A first aspect of the present invention provides a positive electrode active material for a nonaqueous electrolyte secondary battery containing a lithium-nickel-cobalt-manganese composite oxide represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \leq s \leq 0.20$, $0.1 \leq x \leq 0.5$, $0.1 \leq y \leq 0.5$, $0.1 \leq z \leq 0.5$, $x+y+z+u=1$, $0.02 \leq t \leq 0.04$, $0 \leq u \leq 0.1$, and $0 \leq \beta \leq 0.5$) and having a hexagonal layered crystal structure, in which the lithium-nickel-cobalt-manganese composite oxide contains a secondary particle formed of a plurality of flocculated primary particles and a boron compound containing lithium present at least on part of surfaces of the primary particles, in which a water-soluble Li amount present on the surfaces of the primary particles is up to 0.1% by mass relative to the entire amount of the positive electrode active material.

The average particle diameter of the secondary particles is preferably at least 3 μm and up to 20 μm. The average particle diameter of the primary particles is preferably at least 0.2 μm and up to 0.5 μm. [(d90−d10)/(an average particle diameter)] as an indicator indicating a spread of particle size distribution of the secondary particle is preferably up to 0.60. The secondary particle preferably has a hollow structure formed with a hollow part therewithin.

A second aspect of the present invention provides a method for producing a positive electrode active material for a nonaqueous electrolyte secondary battery containing a lithium-nickel-cobalt-manganese composite oxide represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \leq s \leq 0.20$, $0.1 \leq x \leq 0.5$, $0.1 \leq y \leq 0.5$, $0.1 \leq z \leq 0.5$, $x+y+z+u=1$, $0.02 \leq t \leq 0.04$, $0 \leq u \leq 0.1$, and $0 \leq \beta \leq 0.5$) and having a hexagonal layered crystal structure, the method including a crystallization process of obtaining nickel-cobalt-manganese composite hydroxide particles represented by General Formula (2): $Ni_xCo_yMn_zM2_u(OH)_{2+\alpha}$ (in Formula (2), M2 is an element other than Li, Ni, Co, and Mn; $0.1 \le x \le 0.5$, $0.1 \le y \le 0.5$, $0.1 \le z \le 0.5$, $x+y+z+u=1$, $0 \le u \le 0.1$, and $0 \le \alpha \le 0.5$) by crystallization, a lithium mixing process of mixing a lithium compound with the nickel-cobalt-manganese composite hydroxide particles such that the ratio of the number of atoms of lithium to the sum of the numbers of atoms of metal elements other than lithium is at least 0.95 and up to 1.20 to obtain a lithium mixture, a firing process firing the lithium mixture while being held in an oxidative atmosphere at a temperature of at least 800° C. and up to 1,000° C. for at least 5 hours and up to 20 hours to obtain lithium-nickel-cobalt-manganese composite oxide particles formed of a secondary particle formed of a plurality of flocculated primary particles, a boron mixing process of mixing the lithium-nickel-cobalt-manganese composite oxide particles and a boron raw material together to obtain a boron mixture, and a heat treatment process of heat-treating the boron mixture in an oxidative atmosphere at a temperature of at least 200° C. and up to 300° C., in which at the heat treatment process, heat treatment is performed such that a water-soluble Li amount present on surfaces of the primary particles after the heat treatment is up to 1.3 times that of before the heat treatment.

The boron raw material is preferably at least one of boron oxide and an oxoacid of boron. The boron raw material is preferably orthoboric acid. A crushing process of crushing the lithium-nickel-cobalt-manganese composite oxide particles obtained at the firing process may further be provided.

A third aspect of the present invention provides a nonaqueous electrolyte secondary battery including a positive electrode, a negative electrode, a separator, and a nonaqueous electrolyte, in which the positive electrode contains the positive electrode active material for a nonaqueous electrolyte secondary battery.

The positive electrode active material according to the present invention can obtain excellent output characteristics and high battery capacity when used for a positive electrode of a nonaqueous electrolyte secondary battery. The positive electrode active material according to the present invention can inhibit gelation of a positive electrode mixture paste during electrode production and can make the production of the nonaqueous electrolyte secondary battery easier.

The method for producing a positive electrode active material according to the present invention can be performed easily even in production on an industrial scale and is thus industrially extremely useful.

DESCRIPTION OF EMBODIMENTS

Figure 1A:
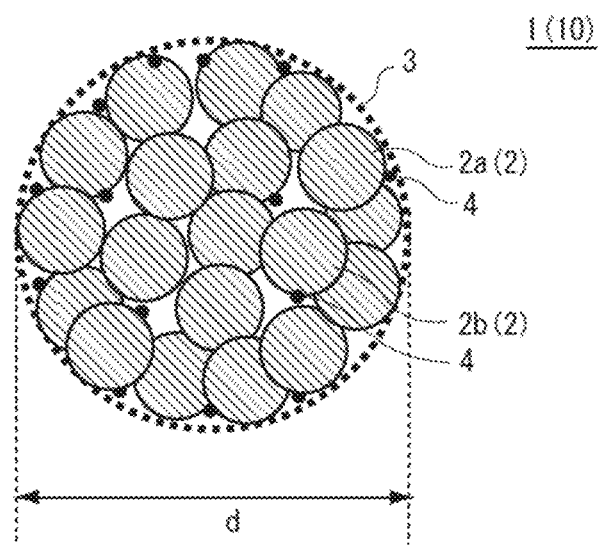
FIGS. 1(A) and 1(B) are diagrams of an exemplary positive electrode active material of the present embodiment.

The following describes a positive electrode active material for a nonaqueous electrolyte secondary battery, a method for producing the same, and the positive electrode active material for a nonaqueous electrolyte secondary battery according to the present embodiment with reference to the accompanying drawings. In the drawings, to make components easier to understand, they are illustrated with a part emphasized or with a part simplified, and actual structures or shapes, a reduced scale, and the like may be different.

Figure 1B:
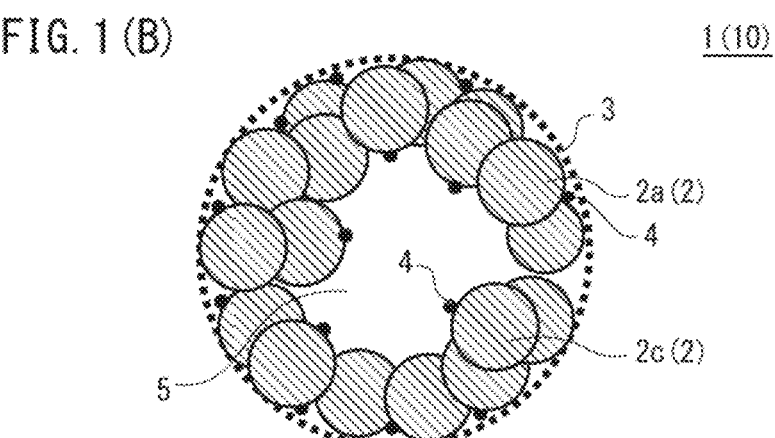

1. Positive Electrode Active Material for Nonaqueous Electrolyte Secondary Battery FIGS. 1(A) and 1(B) are schematic diagrams of an exemplary positive electrode active material 10 for a nonaqueous electrolyte secondary battery (hereinafter, also referred to as a "positive electrode active material 10") according to the present embodiment. As illustrated in FIGS. 1(A) and 1(B) the positive electrode active material 10 contains a lithium-nickel-cobalt-manganese composite oxide 1 (hereinafter, also referred to as a "lithium-metal composite oxide 1").

The lithium composite metal oxide 1 is represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \le s \le 0.20$, $0.1 \le x \le 0.5$, $0.1 \le y \le 0.5$, $0.1 \le z \le 0.5$, $x+y+z+u=1$, $0.02 \le t \le 0.04$, $0 \le u \le 0.1$, and $0 \le \beta \le 0.5$) and has a hexagonal layered crystal structure. The lithium composite metal oxide 1 includes a secondary particle 3 formed of a plurality of flocculated primary particles 2 and a boron compound 4 containing lithium (hereinafter, also referred to as a "lithium-boron compound 4") present at least on part of surfaces of the primary particles 2, in which a water-soluble Li amount present on the surfaces of the primary particles 2 is up to 0.1% by mass relative to the entire amount of the positive electrode active material.

The positive electrode active material 10 makes the lithium-boron compound 4 present on the surfaces of the primary particles 2, thereby reducing the reaction resistance of the positive electrode (hereinafter, also referred to as "positive electrode resistance") and improving initial discharging capacity (hereinafter, also referred to as "battery capacity") in a nonaqueous electrolyte secondary battery (hereinafter, also referred to as a "secondary battery") containing the positive electrode active material 10. The positive electrode resistance of the secondary battery is reduced, whereby voltage lost within the secondary battery reduces, and voltage actually applied to a load side relatively increases, thus resulting in high output. It is considered that the voltage applied to the load side increases, whereby lithium insertion/de-insertion in the positive electrode is sufficiently performed, and battery capacity is also improved.

Although the details of the mechanism by which the positive electrode resistance of the secondary battery containing the positive electrode active material 10 reduces are unclear, it is considered that the lithium-boron compound 4 formed on the surfaces of the primary particles 2 is high in lithium ion conductivity and has an effect of facilitating movement of lithium ions, and thus forms, in the positive electrode of the secondary battery, Li conductive paths on the boundary between an electrolyte solution and the positive electrode active material 10, reduces the positive electrode resistance, and improves battery output characteristics and battery capacity. The lithium-boron compound 4 has the form of a lithium-boron composite oxide, for example.

The positive electrode active material 10 makes the lithium-boron compound 4 present on the surfaces of the primary particles 2 and has a water-soluble Li amount present on the surfaces of the primary particles 2 of up to 0.1% by mass and can thereby inhibit gelation of a positive electrode mixture paste (hereinafter, also referred to as a "paste") containing this positive electrode active material 10. The water-soluble Li amount present on the surfaces of the primary particles 2 refers to, when the positive electrode active material 10 is dispersed in water, the amount of Li eluted to water. At least part of the lithium-boron compound 4 is also eluted to water when the positive electrode active material 10 is dispersed in water, and the water-soluble Li amount includes excessive lithium compounds present on the surfaces of the primary particles 2 and Li derived from the lithium-boron compound 4. The inventors of the present invention have found out that the lithium-boron compound 4 is formed on the surfaces of the primary particles 2 such that the water-soluble Li amount is within the above range, whereby gelation of the paste is inhibited.

It is considered that gelation of the positive electrode mixture paste is caused by excessive lithium compounds such as lithium hydroxide and lithium carbonate present on the surfaces of the primary particles of the lithium composite metal oxide eluted into water contained in the positive electrode mixture paste, which increases the pH value of the paste. Although the details of the mechanism by which gelation of the paste is inhibited in the positive electrode active material 10 are unclear, it is considered that a boron raw material as one of the raw materials of the lithium-boron compound 4 reacts with the excessive lithium compounds present on the surfaces of the primary particles within lithium-metal composite oxide particles (raw materials) in a process of producing the positive electrode active material 10 to form the lithium-boron compound 4, whereby gelation of the paste is inhibited.

On the other hand, when the water-soluble Li amount on the surfaces of the primary particles 2 is greater than 0.1% by mass relative to the entire amount of the positive electrode active material 10, the effect of inhibiting gelation of the paste cannot be obtained. Although the details of this cause are unclear, it is considered that this is because the lithium-boron compound 4 is excessively formed on the surfaces of the primary particles 2, and a water-soluble lithium compound contributing to gelation increases. It is considered that in the process of producing the positive electrode active material 10, the boron raw material reacts with the excessive lithium compounds on the surfaces of the primary particles of the lithium-metal composite oxide particles (raw materials) and in addition also reacts with lithium extracted from crystals of the lithium-metal composite oxide particles (raw materials). Consequently, the excessively formed lithium-boron compound 4 reduces the number of lithium ions contributing to charging and discharging and also causes a reduction in the battery capacity of the secondary battery.

The surfaces of the primary particles 2 refer to the surfaces of the primary particles 2 that can be in contact with the electrolyte solution in the positive electrode of the secondary battery. The lithium-boron compound 4 is formed on the surfaces of the primary particles 2 that can be in contact with the electrolyte solution and can thereby reduce the positive electrode resistance and improve output characteristics and battery capacity. As illustrated in FIG. 1(A), for example, the surfaces of the primary particles 2 include a surface of a primary particle 2a exposed to an outer face (surface) of the secondary particle 3 and a surface of a primary particle 2b within the secondary particle 3 communicating with the surface of the secondary particle 3 to enable the electrolyte solution to penetrate thereinto. The surfaces of the primary particles 2 also include grain boundaries between the primary particles 2 if bonding between the primary particles 2 is imperfect to enable the electrolyte solution to penetrate thereinto. As illustrated in FIG. 1(B), for example, the surfaces of the primary particles 2 include a surface of a primary particle 2c exposed to a hollow part 5 (void) within the secondary particle 3.

The presence of the lithium-boron compound 4 on the surface of the primary particle 2a exposed to the surface of the secondary particle 3 can be determined by X-ray photoelectron spectroscopy (XPS), for example. The presence of boron on the surfaces of the primary particles 2b and 2c within the secondary particle 3 can be determined with a soft X-ray emission spectroscopy (SXES) apparatus mounted on a field emission scanning electron microscope (FE-SEM), for example. Although it is difficult to directly determine the presence form of a minute amount of boron present within the secondary particle 3, lithium is considered to be an element forming a compound with boron and considering that at least part of boron is present in the form of the lithium-boron compound 4 on the surface of the primary particle 2a exposed to the surface of the secondary particle 3, it is estimated that the lithium-boron compound 4 (e.g., a lithium-boron composite oxide) is formed also on the surfaces of the primary particles 2b and 2c within the secondary particle 3.

The lithium-boron compound 4 may be present on part of the surfaces of the primary particles 2 or cover the entire surfaces of the primary particles 2. The lithium-boron compound 4 is present at least on part of the surfaces of the primary particles 2, whereby an effect of reducing the positive electrode resistance is obtained. The lithium-boron compound 4 is preferably fixed to the surfaces of the primary particles 2. With this fixation, conductivity between the lithium-boron compound 4 and the primary particles 2 of the lithium composite oxide can be increased, and the effect of reducing the positive electrode resistance is further obtained. As illustrated in FIGS. 1(A) and 1(B), the lithium-boron compound 4 is preferably formed not only on the surface of the primary particle 2a present on the surface of the secondary particle 3 but also on the surfaces of the primary particles 2b and 2c within the secondary particle 3. When the lithium-boron compound 4 is formed on the surfaces of the primary particles 2b and 2c within the secondary particle 3, movement of lithium ions can be further facilitated.

Part of boron (B) within the lithium-metal composite oxide 1 may be solid-solved in crystals of the lithium-metal composite oxide 1. However, when all boron is solid-solved in the crystals of the lithium-metal composite oxide 1, the effect of reducing the positive electrode resistance cannot be obtained. When boron is solid-solved in the lithium-metal composite oxide 1, a reduction in battery capacity may increase.

In the positive electrode active material 10, the water-soluble Li amount on the surfaces of the primary particles 2 is up to 0.1% by mass relative to the entire amount of the positive electrode active material 10. The positive electrode active material 10 of the present embodiment causes the lithium-boron compound 4 to be formed on the surfaces of the primary particles 2 and has the water-soluble Li amount within the above range and can thereby inhibit gelation of the positive electrode mixture paste. The entire amount of the positive electrode active material means a total amount of the primary particles 2, the secondary particle 3, the lithium-boron compound 4, and compounds containing lithium other than the lithium-boron compound present on the surfaces of the primary particles 2. The lower limit of the water-soluble Li amount is at least 0.01% by mass, for example, relative to the entire amount of the positive electrode active material.

The water-soluble Li amount in the positive electrode active material 10 can be controlled to be within the above range by adjusting the amount of the boron raw material to be added at a boron mixing process (Step S40) and/or heat treatment temperature at a heat treatment process (Step S50) in the process of producing the positive electrode active material 10 described below as appropriate, for example. The water-soluble Li amount present on the surfaces of the primary particles 2 is a value that can be calculated by adding pure water to the positive electrode active material 10, stirring it for a certain period of time, and determining the water-soluble Li amount eluted into the pure water by neutralization titration with hydrochloric acid or the like.

Figure 5A:
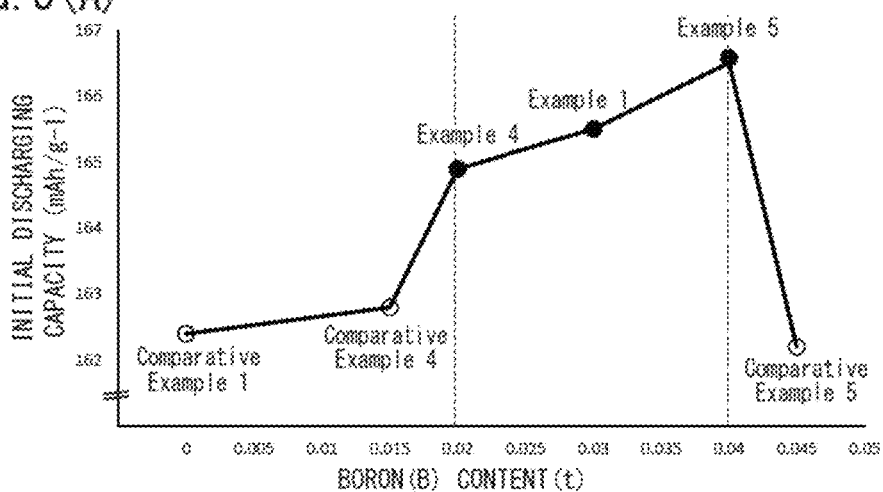
FIGS. 5(A) to 5(C) are graphs of evaluation result of positive electrode active materials obtained in examples and comparative examples.
Figure 5B:
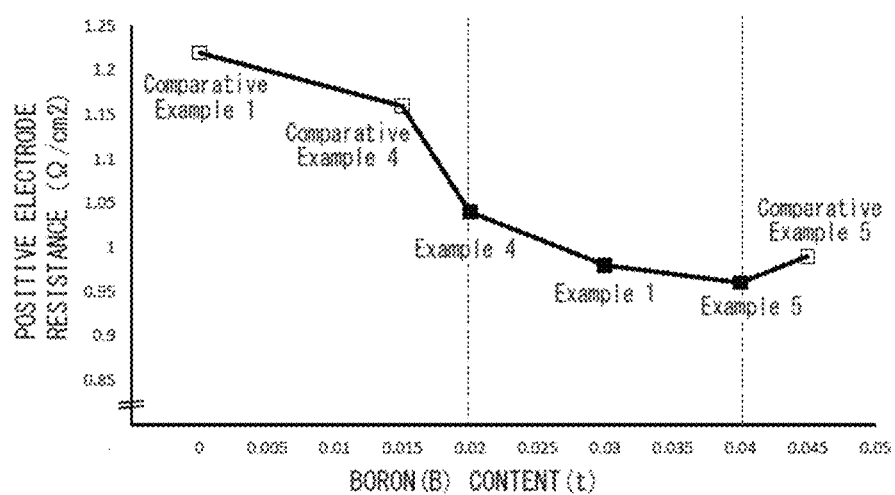
Figure 5C:
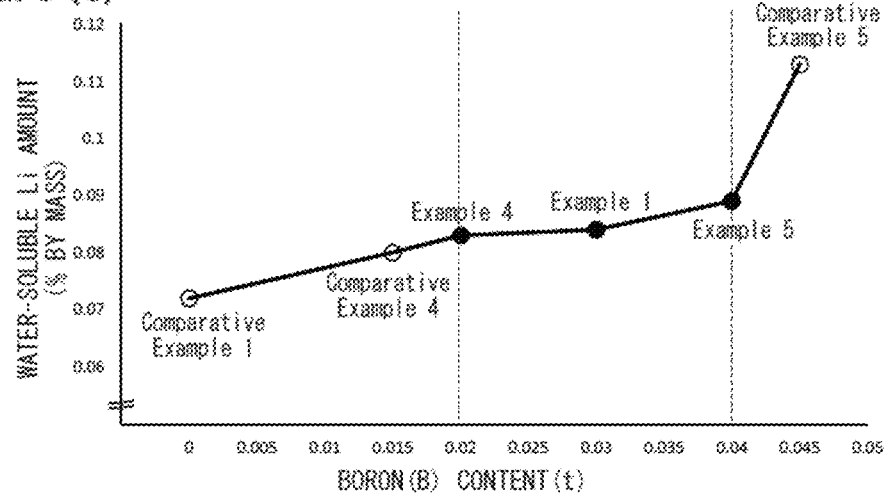

The positive electrode active material 10 may increase in the water-soluble Li amount compared with a lithium-metal composite oxide that does not contain the lithium-boron compound 4. FIGS. 5(A) to 5(C) are diagrams of the initial discharging capacity (FIG. 5(A)), the positive electrode resistance (FIG. 5(B)), and the water-soluble Li amount (FIG. 5(C)) of secondary batteries containing positive electrode active materials obtained in examples and comparative examples described below. As illustrated in FIG. 5(C), for example, the positive electrode active materials obtained in the examples increase in the water-soluble Li amount compared with the positive electrode active material of Comparative Example 1, which does not contain boron (B). It is considered that this result reflects an increase in the amount of the lithium-boron compound 4 present on the surfaces of the primary particles 2, and it is considered that this is because the boron raw material not only reacts with excessive lithium but also reacts with lithium extracted from the crystals within the lithium-metal composite oxide particles (raw materials), thus forming the lithium-boron compound 4.

As shown in Comparative Example 5 in FIGS. 5(A) and 5(C), for example, when the positive electrode active material 1 excessively contains boron, the water-soluble Li amount may increase (FIG. 5(C)), and the intimal discharging capacity may sharply reduce (FIG. 5(A)). As described above, it is considered that lithium within the crystals of the lithium-metal composite oxide particles (raw materials) is excessively extracted, the number of lithium ions contributing to charging and discharging reduces, and thus battery capacity reduces.

The lithium-metal composite oxide 1 has a hexagonal layered crystal structure, and its crystallinity can be evaluated with the length of a c-axis (hereinafter, also referred to as a "c-axis length") obtained by performing Rietveld analysis on an X-ray diffraction result or a lithium seat occupancy (hereinafter, may be referred to as "Li seat occupancy") in lithium sites within crystals, for example.

The Li seat occupancy of the lithium-metal composite oxide 1 is preferably at least 96% and more preferably at least 96.5%. When the Li seat occupancy is controlled to be within the above range, lithium losses in the lithium sites are reduced, and the crystallinity of the lithium composite oxide particles can be maintained at a high level. With this structure, the secondary battery to be obtained can improve in output characteristics and maintain high battery capacity.

The lithium-metal composite oxide 1 is represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \leq s \leq 0.20$, $0.1 \leq x \leq 0.5$, $0.1 \leq y \leq 0.5$, $0.1 \leq z \leq 0.5$, $x+y+z+u=1$, $0.02 \leq t \leq 0.04$, $0 \leq u \leq 0.1$, and $0 \leq \beta \leq 0.5$). General Formula (1) indicates the composition of the entire positive electrode active material 10 including the secondary particle 3 and the lithium-boron compound 4 present on the surfaces of the primary particles 2. The contents of the respective elements can be measured by ICP emission spectroscopy.

In General Formula (1), the range of t indicating a born content of boron satisfies $0.02 \leq t \leq 0.04$. As described above, at least part of boron is present as the lithium-boron compound on the surfaces of the primary particles 2. When t is within the above range, when the positive electrode active material 10 is used for the positive electrode of the secondary battery, a sufficient effect of reducing the positive electrode resistance can be obtained, high battery capacity can be obtained, and gelation of the paste can be inhibited. On the other hand, when t is less than 0.02, no sufficient effect of reducing the positive electrode resistance can be obtained, and gelation of the paste cannot be inhibited. When t is greater than 0.04, battery capacity sharply reduces, and the paste may gelate, although the effect of reducing the positive electrode resistance of the secondary battery is obtained. In view of obtaining a larger effect of reducing the positive electrode resistance and higher battery capacity, the range of t is preferably $0.025 \leq t \leq 0.04$.

In General Formula (1), x indicating a nickel content satisfies $0.1 \leq x \leq 0.5$ and preferably $0.20 \leq x \leq 0.50$. That is to say, the lithium-metal composite oxide 1 contains nickel as a metal element and has a nickel content of at least 10 atom % and up to 50 atom % and preferably at least 20 atom % and up to 50 atom % relative to the sum of the metal elements (except B) other than lithium. The primary particles 2 forming the lithium-metal composite oxide 1 have a crystal structure with a layered rock salt structure. When the nickel content is within the above range, the secondary battery containing the positive electrode active material 10 can achieve high battery capacity.

In General Formula (1), y indicating a cobalt content satisfies $0.1 \leq y \leq 0.5$ and preferably $0.15 \leq y \leq 0.45$. That is to say, the lithium-metal composite oxide 1 has a cobalt content of at least 10 atom % and up to 50 atom % and preferably at least 15 atom % and up to 45 atom % relative to the sum of the metal elements (except B) other than lithium. When the cobalt content is within the above range, the secondary battery containing the positive electrode active material 10 has high crystal structure stability and is more excellent in cycle characteristics.

In General Formula (1), z indicating a manganese content satisfies $0.1 \leq z \leq 0.5$ and preferably $0.15 \leq y \leq 0.45$. That is to say, the manganese content is at least 10 atom % and up to 50 atom % and preferably at least 15 atom % and up to 45 atom % relative to the sum of the metal elements (except B) other than lithium. When the manganese content is within the above range, high thermal stability can be obtained.

Furthermore, to improve battery characteristics, the element M1 other than Li, Ni, Co, Mn, and B may be added. The element M1 may be a metal element, and one or more metal elements selected from Ti, V, Cr, Zr, Nb, Mo, Hf, Ta, Fe, and W may be contained as the element M1, for example. In this case, in General Formula (1), when the content of the element M is u, u preferably satisfies 0≤u≤0.1, and x+y+z+u=1. When the element M is not added, General Formula (1) is represented by General Formula (1)': $Li_{1+s}Ni_xCo_yMn_zB_tO_{2+\beta}$ (in General Formula (1)', −0.05≤s≤0.20, 0.1≤x≤0.5, 0.1≤y≤0.5, 0.1≤z≤0.5, x+y+z=1, 0.02≤t≤0.04, and 0≤β≤0.5). In General Formula (1) or General Formula (1)', β may be 0.

The average particle diameter of the positive electrode active material 10 is preferably at least 3 μm and up to 20 μm and more preferably at least 4 μm and up to 15 μm. When the average particle diameter is within the above range, the secondary battery to be obtained can further achieve both high output characteristics and high battery capacity and high fillability to the positive electrode. When the average particle diameter is less than 3 μm, high fillability to the positive electrode cannot necessarily be obtained; when the average particle diameter is greater than 20 μm, high output characteristics and battery capacity cannot necessarily be obtained.

The average particle diameter of the primary particles 2 is preferably at least 0.2 μm and up to 1.0 μm and more preferably at least 0.3 μm and up to 0.7 μm. With this average particle diameter, higher output characteristics and battery capacity and higher cycle characteristics when used for the positive electrode of the battery can be obtained. When the average particle diameter of the primary particles is less than 0.2 μm, high cycle characteristics cannot necessarily be obtained; when the average particle diameter is greater than 0.7 μm, high output characteristics and battery capacity cannot necessarily be obtained.

The average particle diameter of the primary particles 2 can be measured by observing a section of the secondary particle 3 with a scanning electron microscope (hereinafter, also referred to as a "SEM"). Section observation of the secondary particle 3 is performed by first cutting or the like the composite hydroxide 1 embedded in resin or the like, producing a sample of the section of the secondary particle 3, and observing sections of a plurality of secondary particles 3. The secondary particles 3 to be observed are 20 or more secondary particles 3 in which a distance d (refer to FIG. 1(A)) between two points as a maximum distance on the perimeter of a section of one secondary particle 3 is SO % or more of a volume-average particle diameter (MV) measured using a laser diffraction scattering particle size analyzer selected arbitrarily (at random) in the sections of the secondary particles 3. From each of the selected secondary particles 3, 50 or more primary particles 2 are further selected arbitrarily (at random). Longest diameters of the selected primary particles 2 are measured to determine particle diameters. For the 50 primary particles 2, the determined particle diameters (the longest diameters) are number-averaged to calculate the particle diameter (average) of the primary particles 2 for one secondary particle 3. Furthermore, for the selected 20 secondary particles 3, the calculated particle diameters (average) of the primary particles 2 are number-averaged to calculate the average particle diameter of the primary particles 2 of the entire positive electrode active material.

[(d90−d10)/(the average particle diameter)] as the indicator indicating a spread of particle size distribution of the positive electrode active material 10 is preferably up to 0.60. With this indicator, fine particles and coarse particles are inhibited from mixing to make the particle diameter of the secondary particle uniform, and high cycle characteristics can be obtained. To obtain higher cycle characteristics, [(d90−d10)/(the average particle diameter)] is preferably up to 0.55. Smaller [(d90−d10)/(the average particle diameter)] gives a uniform particle diameter of the secondary particle, but variations in production occur, and the minimum value of [(d90−d10)/(the average particle diameter)] is about 0.25. The spread of the particle size distribution can be within the above range by performing crystallization through a two-stage crystallization process in the process of producing the positive electrode active material to obtain a nickel composite hydroxide as a precursor, for example.

In [(d90−d10)/(the average particle diameter)] indicating a variation indicator of the particle diameter of the positive electrode active material 10, d10 means a particle diameter at which, when the numbers of particles of the respective particle diameters are accumulated from a smaller particle diameter, the accumulated volume reaches 10% of the total volume of all the particles, and d90 means a particle diameter at which, when the numbers of particles are accumulated similarly, the accumulated volume reaches 90% of the total volume of all the particles. The average particle diameter of the positive electrode active material means the volume-average particle diameter (MV). The average particle diameter, d90, and d10 can be measured using a laser diffraction/scattering particle size analyzer.

As illustrated in FIG. 1(B), for example, the positive electrode active material 10 may have a hollow structure in which the secondary particle 3 is formed with the hollow part 5 within the particle. The secondary particle 3 having the hollow structure can be obtained by using lithium-metal composite oxide particles produced by a method disclosed in Patent Literature 6, for example, as raw materials. When the secondary particle 3 has the hollow structure, penetration of the electrolyte into the secondary particle 3 is made easier, and high output characteristics can be obtained more easily. One hollow part 5 may be formed, or a plurality of ones may be formed. The hollow structure includes a porous structure having many voids within the secondary particle 3.

The positive electrode active material 10 contains the lithium-metal composite oxide 1 formed of the secondary particle 2 formed of the flocculated primary particles 1 and may contain a small number of single primary particles such as a primary particle 1 that has not been flocculated as the secondary particle 2 and a primary particle 1 that has fallen from the secondary particle 2 after being flocculated, for example. The positive electrode active material 10 may contain a lithium-metal composite oxide other than the lithium-metal composite oxide 1 to the extent that the effects of the present invention are not impaired.

2. Method for Producing. Positive Electrode Active Material for Nonaqueous Electrolyte Secondary Battery A method for producing a positive electrode active material of the present embodiment (hereinafter, also referred to as a "method of production") can produce a positive electrode active material for a nonaqueous electrolyte secondary battery (hereinafter, also referred to as a "positive electrode active material") containing a lithium-nickel-cobalt-manganese composite oxide (hereinafter, also referred to as a "lithium-metal composite oxide") represented by General Formula (1): $Li_{1+s}Ni_xCo_yMn_zB_tM1_uO_{2+\beta}$ (in Formula (1), M1 is an element other than Li, Ni, Co, Mn, and B; and −0.05≤s≤0.20, 0.1≤x≤0.5, 0.1≤y≤0.5, 0.1≤z≤0.5, x+y+z+u=1, 0.02≤t≤0.04, 0≤u≤0.1, and 0≤β≤0.5) and having a hexagonal layered crystal structure. The method of production of the present embodiment can produce the positive electrode active material 10 on an industrial scale, simply, and with good productivity. The following describes the method of production of the present embodiment with reference to FIGS. 1(A), 1(B) and FIG. 2.

Figure 2:
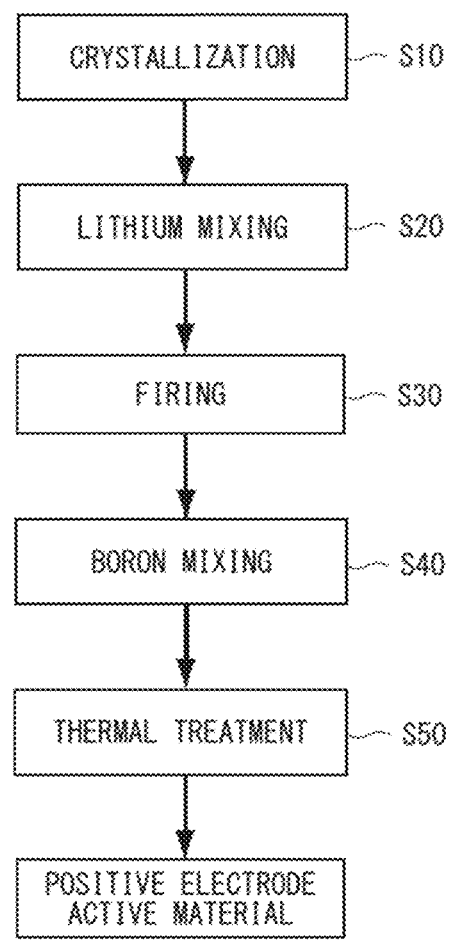
FIG. 2 is a diagram of an exemplary method for producing a positive electrode active material of the present embodiment.

As illustrated in FIG. 2, the method of production of the present embodiment includes a crystallization process (Step S10) of obtaining nickel-cobalt-manganese composite hydroxide particles (hereinafter, also referred to as "composite hydroxide particles") having a specific composition by crystallization, a lithium mixing process (Step S20) of mixing a lithium compound with the composite hydroxide particles to obtain a lithium mixture, a firing process (Step S30) of firing the lithium mixture to obtain lithium-nickel-cobalt-manganese composite oxide particles (hereinafter, also referred to as "lithium-metal composite oxide particles (raw materials)"), the boron mixing process (Step S40) of mixing the boron raw material with the lithium-metal composite oxide particles (raw materials) to obtain a boron mixture, and the heat treatment process (Step S50) of heat-treating the boron mixture. The following describes the method of production according to the present invention in detail.

(Crystallization Process)

The crystallization process (Step S10) is a process of obtaining the composite hydroxide particles represented by General Formula (2): $Ni_xCo_yMn_zM2_u(OH)_{2+\alpha}$ (in Formula (2), M2 is an element other than Li, Ni, Co, and Mn; $0.1 \leq x \leq 0.5$, $0.1 \leq y \leq 0.5$, $0.1 \leq z \leq 0.5$, $x+y+z+u=1$, $0 \leq u \leq 0.1$, and $0 \leq \alpha \leq 0.5$) by crystallization. A crystallization method is not limited to a particular method, and known crystallization methods can be used. The composite hydroxide particles obtained by a normal crystallization method are formed of a secondary particle formed of a plurality of flocculated primary particles, and a positive electrode active material obtained by using these composite hydroxide particles is also formed of a secondary particle formed of a plurality of flocculated primary particles.

For the crystallization method, when the composite hydroxide particles are industrially produced by the crystallization process, a continuous crystallization process can be used, for example. The continuous crystallization process can produce composite hydroxide particles having equal composition in large amounts and easily. However, the continuous crystallization process has a problem in that the particle size distribution of an obtained product is likely to be normal distribution, which is relatively broad, and particles having a uniform particle diameter are not necessarily be able to be obtained. When a positive electrode active material of a lithium-ion secondary battery is produced with such composite hydroxide particles having relatively wide particle size distribution as raw materials to assemble the lithium-ion secondary battery, if fine particles of less than 3 μm is mixed thereinto, they are likely to cause degradation of cycle characteristics. In addition, when the particle size is uneven, the positive electrode resistance increases, which may adversely affect battery output.

In view of the easiness of controlling the particle size distribution, the crystallization method preferably clearly separates the crystallization process (Step S10) like the one disclosed in Patent Literature 5, for example, into a nucleation process and a particle growth process, makes a secondary particle diameter uniform, and obtains composite hydroxide particles narrow in the particle size distribution. The following describes a crystallization method separated into the nucleation process and the particle growth process.

(Nucleation Process)

First, a mixed aqueous solution containing nickel, cobalt, manganese, and an optional additional element M (hereinafter, also referred to as a "mixed aqueous solution") is produced. The mixed aqueous solution is produced by dissolving a nickel salt, a cobalt salt, a manganese salt, and an optional salt of the additional element M, which are highly water soluble, in water at a certain ratio, for example. For the nickel salt, the cobalt salt, and the manganese salt, sulfates are preferably used. If addition of an aqueous solution containing the salt of the additional element M to the mixed aqueous solution causes precipitation, the aqueous solution containing the salt of the additional element M is prepared and is supplied to a reaction liquid described below separately from the mixed aqueous solution.

Next, the mixed aqueous solution and an aqueous solution containing an ammonium ion supplier were supplied to a reaction tank with stirring to form the reaction liquid in the reaction tank, and at the same time, an alkali aqueous solution is supplied thereto to perform control so as to keep the pH value of the reaction liquid constant. The amount of the alkali aqueous solution is adjusted so as to cause the reaction liquid to have a constant pH value, whereby microscopic nuclei of the composite hydroxide particles can be selectively generated during the reaction.

The pH value of the reaction liquid is adjusted to be at least 12.0 and preferably at least 12.0 and up to 14.0 as a pH value with a liquid temperature of 25° C. as a basis. When the pH value is within the above range, the microscopic nuclei of the composite hydroxide particles can be selectively generated in the reaction liquid. When the pH value is less than 12.0, nucleus growth simultaneously occurs, and the particle size distribution is likely to be broad, and in addition, the total number of nuclei is insufficient, and the particle diameter is likely to be coarse. The total number of nuclei can be controlled by pH, an ammonia concentration, and the amount of supplied mixed aqueous solution in the nucleation process.

The ammonia concentration in the reaction liquid is preferably held at a constant value within a range of at least 3 g/L and up to 15 g/L. When the ammonia concentration is held within the above range, the solubility of metal ions can be held constant, and thus uniform hydroxide particles can be formed, and generation of gel-like nuclei is inhibited. In addition, the particle size distribution can be controlled to a certain range. On the other hand, when the ammonia concentration is greater than 15 g/L, the composite hydroxide particles are densely formed, and thus the positive electrode active material to be finally obtained also has a dense structure and may be low in specific surface area.

The temperature of the reaction liquid is preferably set to at least 35° C. and up to 60° C. When the temperature of the reaction liquid is less than 35° C., the temperature is low, and the solubility of supplied metal ions cannot be sufficiently obtained, nucleation is likely to occur, and it is not easy to control nucleation. When the temperature of the reaction liquid is greater than 60° C., volatilization of ammonia is facilitated, whereby ammonia for complex formation is insufficient, and the solubility of metal ions is likely to reduce similarly. A pH value and a crystallization time at the nucleation process (Step S11) can be set at will depending on a target average particle diameter of the composite hydroxide particles.

(Particle Growth Process)

At the particle growth process, the reaction liquid is controlled to have a pH value that is at least 10.5 and up to 12.0 and is lower than that of the nucleation process as a pH value with a liquid temperature of 25° C. as a basis. The pH value is controlled to this range after nucleation, whereby only the growth of the nuclei generated at the nucleation process is preferentially caused to inhibit new nucleation, whereby uniformity in the particle size of the composite hydroxide particles can be substantially improved. When the pH value is greater than 12.0, not only particle growth but also nucleation occurs, and it is difficult to substantially improve uniformity in the particle size. In contrast, when the pH value is less than 10.5, the number of metal ions remaining in the reaction liquid increases, and thus production efficiency degrades. When sulfates are used as raw materials, sulfur (S) content remaining in the composite hydroxide particles increases, which is not preferred. The ammonia concentration and the temperature of the reaction liquid may be set to ranges similar to those of the nucleation process.

After nucleation or during the particle growth step, part of a liquid component in the reaction liquid is discharged to the outside of the reaction tank, whereby after increasing the concentration of the composite hydroxide particles in the reaction liquid, particle growth can be continuously performed. By doing so, the particle size distribution of the particles can be further narrowed, and particle density can also be increased.

An atmosphere within the reaction tank during the nucleation process and the particle growth process is controlled, whereby the particle structure of the positive electrode active material obtained using the composite hydroxide particles can be controlled. That is to say, the oxygen concentration of the atmosphere is controlled, whereby the size of the primary particles forming the composite hydroxide particles can be controlled, and the denseness of the composite hydroxide particles can be controlled. Consequently, the oxygen concentration within the reaction tank is reduced to make a non-oxidative atmosphere, whereby the denseness of the composite hydroxide particles increases, and the positive electrode active material to be obtained increases in denseness to have a solid structure. On the other hand, the oxygen concentration within the reaction tank is increased, whereby the denseness of the composite hydroxide particles reduces, and the positive electrode active material to be obtained has a hollow structure or a porous structure. In particular, the inside of the reaction tank is controlled to make an oxidative atmosphere in the early stage of the nucleation process and the particle growth process and is then controlled to be a non-oxidative atmosphere, whereby the denseness of the central part of the composite hydroxide particles can be reduced, whereas the denseness of the periphery part thereof can be increased. The positive electrode active material obtained from such composite hydroxide particles has a hollow structure having a hollow part of a sufficient size. The size of the hollow part can be controlled by adjusting a period of time during which the oxidative atmosphere is made and a period of time during which the non-oxidative atmosphere is made.

The composite hydroxide particles obtained by the crystallization method are represented by General Formula (2): $Ni_xCo_yMn_zM2_u(OH)_{2+\alpha}$ (M2 is an element other than Li, Ni, Co, and Mn; $x+y+z+u=1$, $0.1 \le x \le 0.5$, $0.1 \le y \le 0.5$, $0.1 \le z \le 0.5$, $0 \le u \le 0.1$, and $0 \le \alpha \le 0.5$). In General Formula (2), M2 may contain or does not necessarily contain B. M2 may be a metal element and may be one or more metal elements selected from Ti, V, Cr, Zr, Nb, Mo, Hf, Ta, Fe, and W. In General Formula (2), a is a coefficient varying in accordance with the valence number of metal elements contained in the composite hydroxide. The composition ratio of the metal elements in the composite hydroxide particles is maintained until the composition ratio of the metal elements of the lithium composite oxide particles forming the positive electrode active material, that is, the lithium-metal composite oxide particles (raw materials) making the lithium-boron compound present on the surfaces of the primary particles thereof. Consequently, the composition ratio of the composite hydroxide particles is adjusted so as to be the composition ratio of the lithium composite oxide particles.

(Lithium Mixing Process)

The lithium mixing process (Step S20) is a process of mixing the composite hydroxide particles and the lithium compound together to obtain the lithium mixture. The composite hydroxide particles and the lithium compound are mixed together such that the ratio (Li/Me) of the atom number of lithium (Li) to the sum of the atom numbers of the metal elements other than lithium (Me) in General Formula (2) is at least 0.95 and up to 1.20. When Li/Me is less than 0.95, the positive electrode resistance of the secondary battery increases, and output characteristics degrade. When Li/Me is greater than 1.20, the initial discharging capacity of the secondary battery reduces, and the positive electrode resistance increases. In view of obtaining high discharging capacity and excellent output characteristics, the composite hydroxide particles and the lithium compound are preferably mixed together such that Li/Me is at least 1.00 and up to 1.15.

The lithium compound is not limited to a particular compound, and known compounds can be used; preferred examples thereof include lithium hydroxide, lithium carbonate, and mixtures thereof. In view of handleability and quality stability, the lithium compound is more preferably lithium carbonate.

The composite hydroxide particles and the lithium compound are preferably sufficiently mixed together. For mixing, general mixers can be used; examples thereof include shaker mixers, Loedige mixers, Julia mixers, and V blenders. The composite hydroxide particles may be sufficiently mixed with the lithium compound to the extent that the skeleton of the composite hydroxide particles is not destroyed.

To accurately control Li/Me of the lithium mixture, the composite hydroxide particles may be heat-treated before being mixed with the lithium compound to convert at least part of the composite hydroxide particles into composite oxide particles. The composite hydroxide particles are converted into the composite oxide particles, whereby a water content contained when being mixed with the lithium compound is made constant, and Li/Me is stabilized.

The method of production of the present embodiment may include a process of heating the composite hydroxide particles to remove part of water remaining in the composite hydroxide particles before the lithium mixing process (Step S20). The heating temperature at this process is at least 105° C. and up to 700° C., for example. At least part of water remaining in the composite hydroxide particles is removed, whereby Li/Me of the positive electrode active material obtained at the firing process (Step S30) can be prevented from varying. In addition, the heating may convert at least part of the composite hydroxide particles into composite oxide particles. The lithium mixing process (Step S20) may mix the composite hydroxide particles and/or the composite oxide particles and the lithium compound together.

(Firing Process)

Next, the lithium mixture is held and fired in an oxidative atmosphere at a temperature of at least 800° C. and up to 1,000° C. for at least 5 hours and up to 20 hours to obtain the lithium-metal composite oxide particles (raw materials) formed of the secondary particle 3 formed of the flocculated primary particles 2 (Step S30).

The firing temperature of the lithium mixture is at least 800° C. and up to 1,000° C. When the firing temperature is less than 800° C., the reaction between the composite hydroxide particles and the lithium compound does not sufficiently proceed, diffusion of lithium into the composite hydroxide particles is insufficient, excessive lithium or unreacted composite oxide particles remain, or crystal structures are not sufficiently formed within the primary particles, and thus reductions in the output characteristics and the battery capacity of the secondary battery may occur. In contrast, when the firing temperature is greater than 1,000° C., sintering violently occurs among the secondary particles (raw materials), abnormal particle growth occurs, thus making the particles coarse, and reductions in output characteristics and battery capacity may occur.

The holding time at the firing temperature is at least 5 hours to up to 20 hours and preferably at least 5 hours to up to 10 hours. When the holding time is less than 5 hours, the secondary particles (raw materials) formed of the lithium-nickel-cobalt-manganese composite oxide are not sufficiently generated. In contrast, when the holding time is greater than 20 hours, sintering violently occurs among the secondary particles (raw materials), abnormal particle growth occurs, and the particles may be made coarse.

The atmosphere during firing may be any oxidative atmosphere, which preferably has an oxygen concentration of at least 18% by volume and up to 100% by volume. That is to say, the firing process (Step S30) is preferably performed in an air or oxygen flow and more preferably performed in an air flow in view of costs. When the oxygen concentration is less than 18% by volume, oxidation may be insufficient, and the crystallinity of the lithium-metal composite oxide particles may be insufficient. A furnace for use in firing, which is not limited to a particular furnace, may be any one so long as it can perform heating in an air or oxygen flow; an electric furnace, which does not involve gas generation, is preferred, and a batch type or continuous furnace is used.

The firing process (Step S30) may further include a process of crushing the obtained lithium-metal composite oxide particles (raw materials). Although in the above firing condition violent sintering and abnormal particle growth of the lithium-metal composite oxide particles (raw materials) to be obtained are inhibited, slight sintering may occur among the lithium-metal composite oxide particles (raw materials). Given these circumstances, the fired lithium-metal composite oxide particles (raw materials) are crushed, whereby the slightly flocculated (sintered) secondary particles 3 can be separated from each other. Crushing may be by any method normally performed and may be performed to the extent the secondary particle 3 of the lithium-metal composite oxide particles is not destroyed.

(Boron Mixing Process)

Next, the lithium composite oxide particles (raw materials) and the boron raw material are mixed together to obtain the boron mixture (Step S40). At least part of the boron raw material reacts with lithium within the lithium-metal composite oxide particles (raw materials) in the subsequent heat treatment process (Step S40) to form the lithium-boron compound on the surfaces of the primary particles 2.

A boron content in the boron mixture is substantially maintained also in the positive electrode active material 10 obtained after the heat treatment process (Step S40). Consequently, the boron raw material may be mixed in an amount corresponding to a target boron content of the positive electrode active material 10 and may be contained within a range of at least 2 at % and up to 4 at % relative to the atom numbers of Ni, Co, and Mn within the lithium-metal composite oxide particles (raw materials), for example. That is to say, in General Formula (1): $Li_{1+s}Ni_xCo_yMn_zB_tM1_uO_{2+\beta}$, the boron raw material is mixed such that the range of t indicating the content of boron (B) satisfies $0.02 \le t \le 0.04$, whereby both improvement in output characteristics and inhibition of gelation of the positive electrode mixture paste can be achieved. When the boron raw material is mixed such that t is greater than 0.04, the amount of boron solid-solved in the crystals of the lithium composite oxide particles extremely increases, and battery characteristics may degrade.

The boron raw material to be used is not limited to a particular raw material so long as it is a raw material containing boron; in view of controlling an increase in the amount of excessive lithium to further inhibit gelation of the paste, a boron raw material that does not contain lithium is preferably used. For the boron raw material, compounds containing boron and oxygen can be used, for example; in view of handleability and being excellent in quality stability, boron oxide, an oxoacid of boron, and mixtures thereof are preferably used, and orthoboric acid is more preferably used.

For the mixing of the lithium composite oxide particles (raw materials) and the boron raw material, general mixers can be used; examples thereof include shaker mixers, Loedige mixers, Julia mixers, and V blenders. For mixing, the lithium composite oxide particles (raw materials) and the boron raw material may be sufficiently mixed together to the extent that the skeleton of the lithium composite oxide particles is not destroyed. To contain boron uniformly among the lithium composite oxide particles (raw materials) at the firing process (Step S40), mixing is preferably performed sufficiently such that the lithium composite oxide particles and the boron raw material are uniformly dispersed in the boron mixture.

(Heat Treatment Process)

Next, the boron mixture is heat-treated in the atmosphere at a temperature of at least 200° C. and up to 300° C. to obtain the lithium-metal composite oxide 1 (Step S50). When the heat treatment is performed within the above temperature range, the boron raw material and an unreacted lithium compound present on the surfaces of the primary particles of the lithium-metal composite oxide particles (raw materials) or excessive lithium within the crystals of the primary particles are reacted with each other to diffuse boron into the secondary particle 3, thus forming the lithium-boron compound 4 on the surfaces of the primary particles. The positive electrode active material 10 containing the obtained lithium-metal composite oxide 1 reduces the positive electrode resistance of the secondary battery and can inhibit gelation of the positive electrode mixture paste.

On the other hand, when the heat treatment is performed at a temperature of less than 200° C., the reaction of the boron raw material and lithium within the lithium-metal composite oxide particles is insufficient, and an unreacted boron raw material remains, or the lithium-boron compound is not sufficiently formed, and the effect of reducing the positive electrode resistance described above cannot be obtained. When the heat treatment is performed at a temperature greater than 300° C., gelation of the positive electrode mixture paste containing the obtained positive electrode active material cannot be sufficiently inhibited, and the battery capacity of the secondary battery reduces. Although the reason for this is not limited to a particular reason, it is considered this is because boron not only reacts with unreacted lithium (excessive lithium) on the surfaces of the primary particles but also excessively reacts with lithium within the crystals of the primary particles, and lithium within the primary particles is excessively extracted, which reduces the number of lithium ions contributing to charging and discharging and increases the water-soluble Li amount contributing to gelation of the positive electrode mixture paste on the surfaces of the primary particles, for example.

At the heat treatment process (Step S50), the heat treatment is performed within the above temperature range, and the heat treatment is performed with its heat treatment condition adjusted such that the water-soluble Li amount present on the (entire) surfaces of the primary particles 2 after the heat treatment is up to 1.3 times that of before the heat treatment. When the water-soluble Li amount is within the above range, lithium within the crystals of the primary particles is inhibited from being excessively extracted, and the crystallinity of the lithium composite oxide particles can be maintained. In addition, excessive generation of the lithium-boron compound is inhibited, and gelation of the positive electrode mixture paste can be inhibited. On the other hand, when the water-soluble Li amount is greater than the above range, lithium within the crystals of the lithium composite oxide particles is excessively extracted to form the lithium-boron compound, whereby the amount of excessive lithium to be detected increases. The water-soluble Li amount can be controlled by adjusting a heat treatment time in accordance with the addition amount of the boron raw material, for example. The lower limit of the water-soluble Li amount after the heat treatment is at least 1 time and preferably up to 1.3 times that of before the heat treatment. It is considered that the increase of the water-soluble Li amount after the heat treatment reflects the amount of the lithium-boron compound 4 formed on the surfaces of the primary particles 2 as described above.

The heat treatment time, which can be adjusted as appropriate in accordance with the amount of formation of excessive lithium, is preferably at least 5 hours and up to 20 hours and more preferably at least 5 hours and up to 10 hours. When the heat treatment time is within the above range, the lithium-boron compound 4 is sufficiently generated, and the output characteristics of the secondary battery can be further improved. On the other hand, when the heat treatment time is less than 5 hours, the lithium-boron compound is not necessarily sufficiently generated. When the heat treatment time is greater than 20 hours, lithium within the crystals of the lithium composite oxide particles may be excessively extracted.

The atmosphere during the heat treatment can be any atmosphere as long as it is an oxidative atmosphere, which preferably has an oxygen concentration of at least 18% by volume and up to 100% by volume. That is to say, the heat treatment process (Step S50) is preferably performed in an air or oxygen flow and is more preferably performed in an air flow in view of costs. When the oxygen concentration is less than 18% by volume, the formation of the lithium-boron compound is not necessarily sufficient. For a furnace used for the heat treatment, a furnace similar to the furnace used for the firing process can be used.

3. Nonaqueous Electrolyte Secondary Battery

The nonaqueous electrolyte secondary battery of the present embodiment (hereinafter, also referred to as a "secondary battery") can achieve both improvement in output characteristics and battery capacity, and inhibition of gelation of the positive electrode mixture paste when the secondary battery is produced by using the positive electrode active material described above for its positive electrode. The following describes an example of the secondary battery of the present embodiment for each component. The secondary battery of the present embodiment can be configured by components similar to those of known lithium-ion secondary batteries and includes a positive electrode, a negative electrode, and a nonaqueous electrolyte solution, for example. The embodiment described below is only by way of example, and the nonaqueous electrolyte secondary battery can be achieved with forms to which various modifications and improvements have been made based on the knowledge of those skilled in the art including the following embodiment. The secondary battery of the present embodiment is not limited to particular uses.

(Positive Electrode)

Using the positive electrode active material, the positive electrode of the secondary battery is produced. The following describes an example of a method for manufacturing the positive electrode. First, the positive electrode active material (powdery), an electric conductor, and a binding agent (binder) are mixed together, activated carbon as needed and a solvent or the like are further added thereto, and this mixture is kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the electric conductor, and 1 to 20% by mass of the binding agent can be contained, for example.

Examples of the electric conductor include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene-diene rubber, styrene butadiene, cellulosic resins, and polyacrylic acid.

To the positive electrode mixture paste, activated carbon and a solvent can be added as needed. The positive electrode mixture paste can be obtained by adding a solvent for dispersing the positive electrode active material, the electric conductor, and the activated carbon and dissolving the binding agent to the positive electrode mixture, for example. The activated carbon is added to the positive electrode mixture, whereby electric double layer capacity can be increased. The solvent dissolves the binding agent and can adjust the viscosity of the positive electrode mixture paste and the like. Examples of the solvent include organic solvents such as N-methyl-2-pyrrolidone (NMP).

Next, the obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. The method for producing the positive electrode is not limited to the exemplified one and may be another method.

(Negative Electrode)

Examples of the negative electrode include metal lithium, lithium alloys. The negative electrode may be formed by applying a negative electrode mixture obtained by mixing a binding agent with a negative electrode active material that can occlude and desorb lithium ions and adding an appropriate solvent to be paste form to the surface of a metal foil collector such as copper, drying, and compressing it in order to increase electrode density as needed.

Examples of the negative electrode active material include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte, and known separators can be used; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Battery)

The nonaqueous electrolyte secondary battery according to the present invention including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

(Shape and Configuration of Secondary Battery)

The shape of the secondary battery of the present embodiment, which is not limited to a particular shape, can be formed into various shapes such as cylindrical and stacked shapes. For any shape employed, the secondary battery can be configured by the positive electrode, the negative electrode, the separator, and the nonaqueous electrolyte solution described above. A method for producing the secondary battery is not limited to a particular method; the secondary battery is produced by stacking the positive electrode and the negative electrode via the separator to form an electrode body, impregnating the obtained electrode body with the nonaqueous electrolyte solution, connecting between a positive electrode collector and a positive electrode terminal communicating with the outside and between a negative electrode collector and a negative electrode terminal communicating with the outside each using a collector lead or the like, and hermetically sealing the electrode body in a battery case, for example.

(Characteristics of Secondary Battery)

The secondary battery of the present embodiment has the positive electrode containing the positive electrode active material 10 and is thus high in capacity and excellent in output characteristics. The positive electrode active material 10 for use in secondary batteries can be obtained by the industrial method of production and is thus extremely excellent in productivity. The secondary battery of the present embodiment is not limited to particular uses and can be suitably used for power supplies of small-sized portable electronic devices (such as notebook personal computers and cellular phone terminals), which always require high capacity, for example.

The secondary battery of the present embodiment is higher in thermal stability, is more excellent in safety, is higher in capacity, and is more excellent in output characteristics than conventional secondary batteries containing the positive electrode active material of a lithium-cobalt-based oxide or a lithium-nickel-based oxide in their positive electrodes. Consequently, the secondary battery containing the positive electrode active material 10 can be reduced in size and increased in output and can be suitably used as power supplies for electric vehicles subjected to limitation in mounting space, for example.

Furthermore, the secondary battery of the present embodiment can be used as not only power supplies for electric vehicles purely driven by electrical energy but also power supplies for what is called hybrid cars, which use combustion engines such as gasoline engines and diesel engines in combination, for example.

EXAMPLES

The following describes the present invention in more detail with reference to examples and comparative examples of the present invention; the present invention is not limited by these examples at all. Methods for analyzing and methods for evaluating metals contained in the positive electrode active materials in the examples and the comparative examples are as follows.

(1) Composition Analysis: Was Measured by ICP Emission spectroscopy.

(2) Average Particle Diameter and [(d90–d10)/Average Particle Diameter]:

Measurement of the average particle diameter and [(d90–d10)/the average particle diameter] of the positive electrode active material was performed with a laser diffraction/scattering particle size distribution measurement apparatus (Microtrac HRA manufactured by Nikkiso Co., Ltd.). A volume-average particle diameter MV was used for the average particle diameter of the positive electrode active material. For the average particle diameter of the primary particles, sections of 20 secondary particles (selected arbitrarily) that are at least 80% of the volume-average particle diameter MV measured using a laser diffraction/scattering particle size analyzer were observed with a scanning electron microscope (SEM), and the particle diameters (the longest diameters) of arbitrary 50 primary particles were measured for each of the secondary particles. The measured particle diameters were number-averaged to calculate the particle diameter (average) of the primary particles for each of the secondary particles. Furthermore, for the 20 secondary particles, the calculated particle diameters (average) of the primary particles for each of the secondary particles were number-averaged to determine the average particle diameter of the primary particles of the entire positive electrode active material.

(3) Initial Discharging Capacity:

An initial discharging capacity was determined as follows: a coin-type battery was produced and was allowed to stand for about 24 hours, was charged to a cutoff voltage 4.3 V with a current density to the positive electrode of 0.1 mA/cm$^2$ after an open circuit voltage (OCV) stabilized, and was discharged to a cutoff voltage 3.0 V after a one-hour suspension; the capacity at this time was taken as the initial discharging capacity. For the measurement of the discharging capacity, a multi-channel voltage/current generator (R6741A manufactured by Advantest Corporation) was used.

Figure 7:
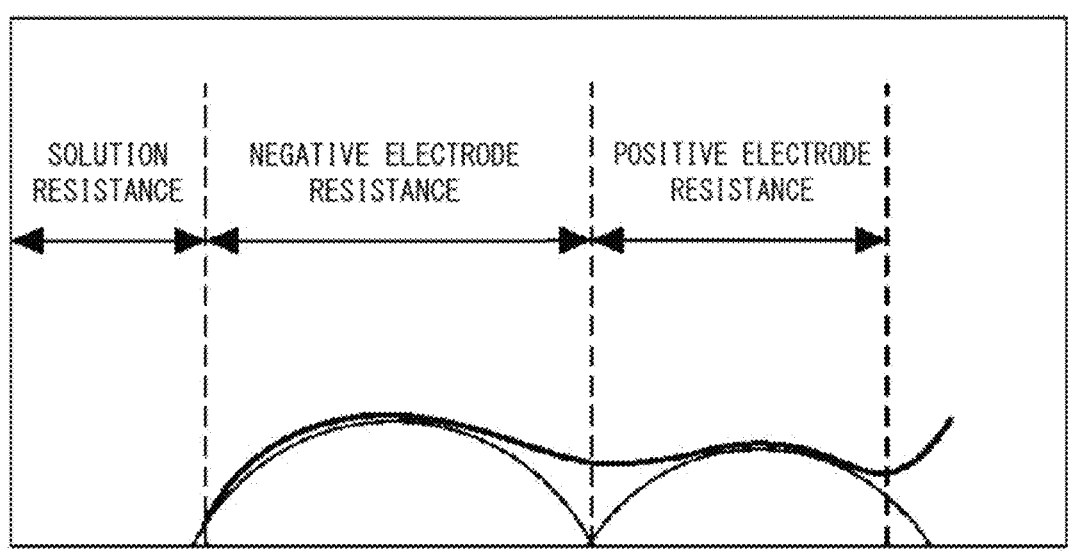
FIG. 7 is a diagram of an exemplary Nyquist plot.
Figure 8:
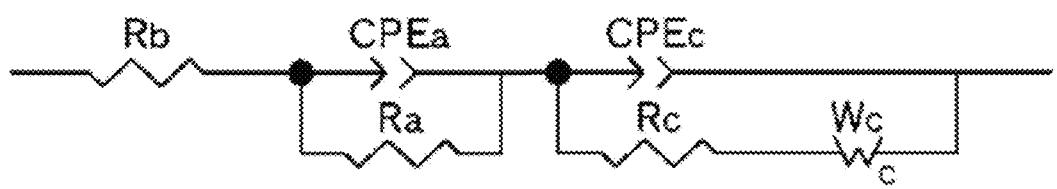
FIG. 8 is a diagram of an equivalent circuit used for impedance evaluation.

(4) Reaction Resistance:

For reaction resistance, the coin-type battery was adjusted to have a measurement temperature and charged at a charge potential of 4.1 V, and then a resistance value was measured by an AC impedance method. For the measurement, using a frequency response analyzer and a potentiogalvanostat (1255B manufactured by Solartron), a Nyquist plot illustrated in FIG. 7 was created, and fitting calculation was performed using an equivalent circuit illustrated in FIG. 8 to calculate a value of positive electrode resistance (the reaction resistance).

(5) Measurement of Water-Soluble Li Amount

A water-soluble Li amount present on the surfaces of the primary particles of the obtained positive electrode active material was evaluated by determining the amount of Li eluted from the positive electrode active material by neutralization titration. The water-soluble Li amount was measured by adding pure water to the obtained positive electrode active material, stirring it for a certain period of time, and adding hydrochloric acid to filtrate after filtration while measuring the pH thereof; the water-soluble Li amount was calculated from the amount of added hydrochloric acid.

(6) Viscosity Stability of Positive Electrode Mixture Paste

With a sun-and-planet motion kneader, mixed were 25.0 g of the positive electrode active material, 1.5 g of carbon powder as a conductive material, 2.9 g of polyvinylidene fluoride (PVDF), and N-methyl-2-pyrrolidone (NMP) to obtain a positive electrode mixture paste. The addition amount of N-methyl-2-pyrrolidone (NMP) was adjusted such that the viscosity was 1.5 to 2.5 Pa·s by a method of measuring viscosity with an oscillational viscometer prescribed in JIS Z 8803:2011. The obtained paste was stored for 76 hours, and the occurrence of gelation was visually evaluated; no occurrence of gelation was evaluated as "pass," whereas an occurrence of gelation was evaluated as "fail."

(7) Detection of Lithium-Boron Compound

A surface of the positive electrode active material was analyzed with XPS (VersaProbe II manufactured by Ulvac-Phi, Inc.). When a waveform indicating chemical combination with lithium was recognized at a boron peak, it was determined that a lithium-boron compound was formed on the surface of the positive electrode active material (the primary particles).

Example 1

(Crystallization Process)

First, water was put into a reaction tank (60 L) to fill it halfway and was stirred in the atmosphere, and an intra-tank temperature was set to 40° C., to which appropriate amounts of a 25% by mass aqueous sodium hydroxide solution and 25% by mass ammonia water were added. The pH value of the liquid within the tank was adjusted to 12.8 with a liquid temperature of 25° C. as a basis, and the ammonia concentration within the liquid was adjusted to 10 g/L. Added thereto was a 2.0 mol/L mixed aqueous solution of nickel sulfate, cobalt sulfate, and manganese sulfate (with a metal element molar ratio of Ni:Co:Mn=38:32:30) at a rate of 130 ml/minute to obtain a reaction aqueous solution. At the same time, 25% by mass ammonia water and a 25% by mass aqueous sodium hydroxide solution were added thereto at a constant rate to perform crystallization for 2 minutes and 30 seconds while controlling the pH value to 12.8 (nucleation pH). Subsequently, while circulating a nitrogen gas to reduce an oxygen concentration within the reaction tank to up to 2% by volume, only the supply of the 25% by mass aqueous sodium hydroxide solution was suspended until the pH value reached 11.6 (nucleus growth pH) with a liquid temperature of 25° C. as a basis, and after the pH value reached 11.6, the supply of the 25% by mass aqueous sodium hydroxide solution was resumed to continue crystallization for 4 hours while controlling the pH value to 11.6 and ended crystallization. After crystallization, the product was washed with water, was filtered, and was dried to obtain nickel-cobalt-manganese composite hydroxide particles represented by $Ni_{0.38}Co_{0.32}Mn_{0.30}(OH)_{2+\alpha}$ ($0 \leq \alpha \leq 0.5$).

(Lithium Mixing Process and Firing Process)

The obtained composite hydroxide particles and lithium carbonate weighed so as to be Li/Me=1.07 were sufficiently mixed together using a shaker mixer (TURBULA Type T2C manufactured by Willy A. Bachofen (WAB)) to obtain a lithium mixture. This lithium mixture was fired by holding it in an air (oxygen: 21% by volume) flow at 900° C. for 10 hours and was then crushed to obtain lithium-nickel-cobalt-manganese composite oxide particles.

(Boron Mixing Process and Heat Treatment Process)

Furthermore, the obtained lithium composite oxide particles and orthoboric acid weighed so as to be t=0.03 in General Formula (1) indicating the composition of the positive electrode active material after heat treatment were sufficiently mixed together using a shaker mixer (TURBULA Type T2C manufactured by Willy A. Bachofen (WAB)) to obtain a boron mixture. This boron mixture was subjected to heat treatment by holding it in an air (oxygen: 21% by volume) flow at 250° C. for 10 hours to obtain a positive electrode active material.

Figure 3:
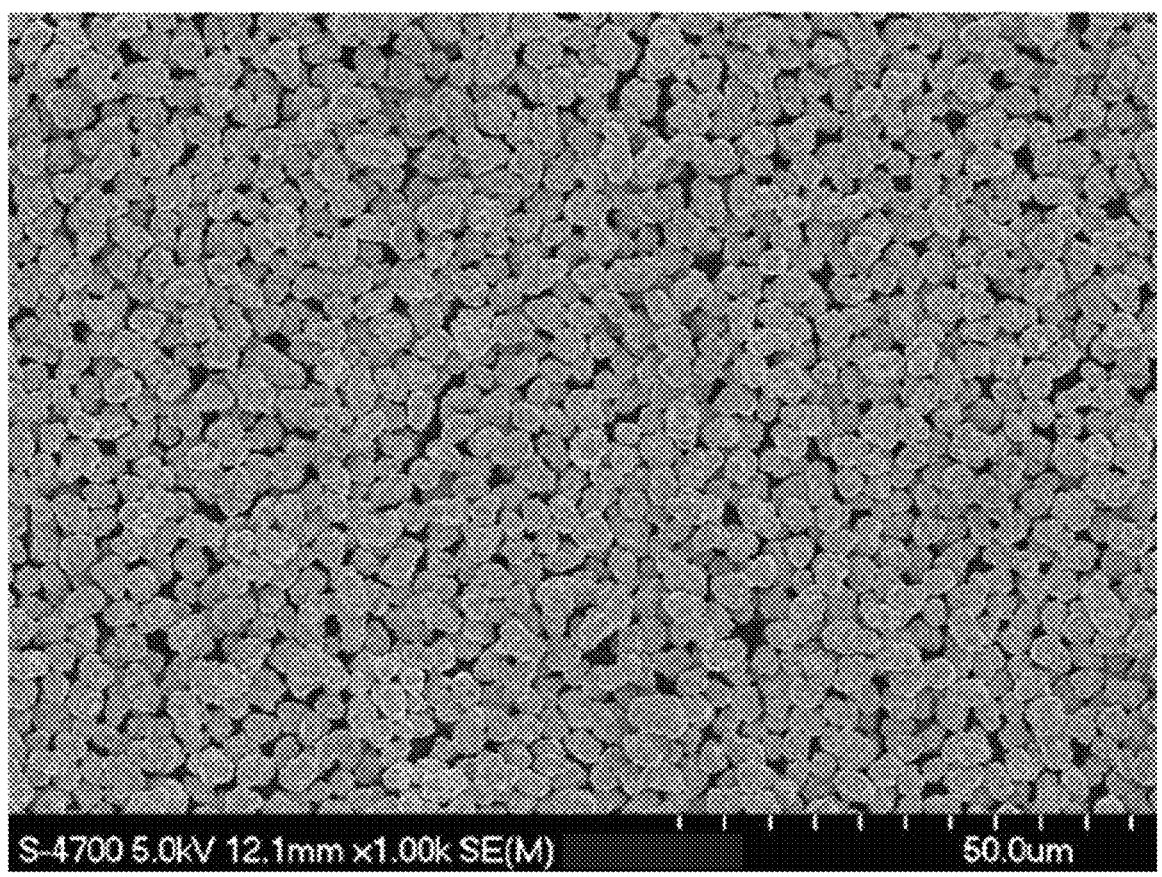
FIG. 3 is a photograph (observation magnification: 1,000-fold) of an exemplary observation result of the positive electrode active material of the present embodiment with a scanning electron microscope.
Figure 4A:
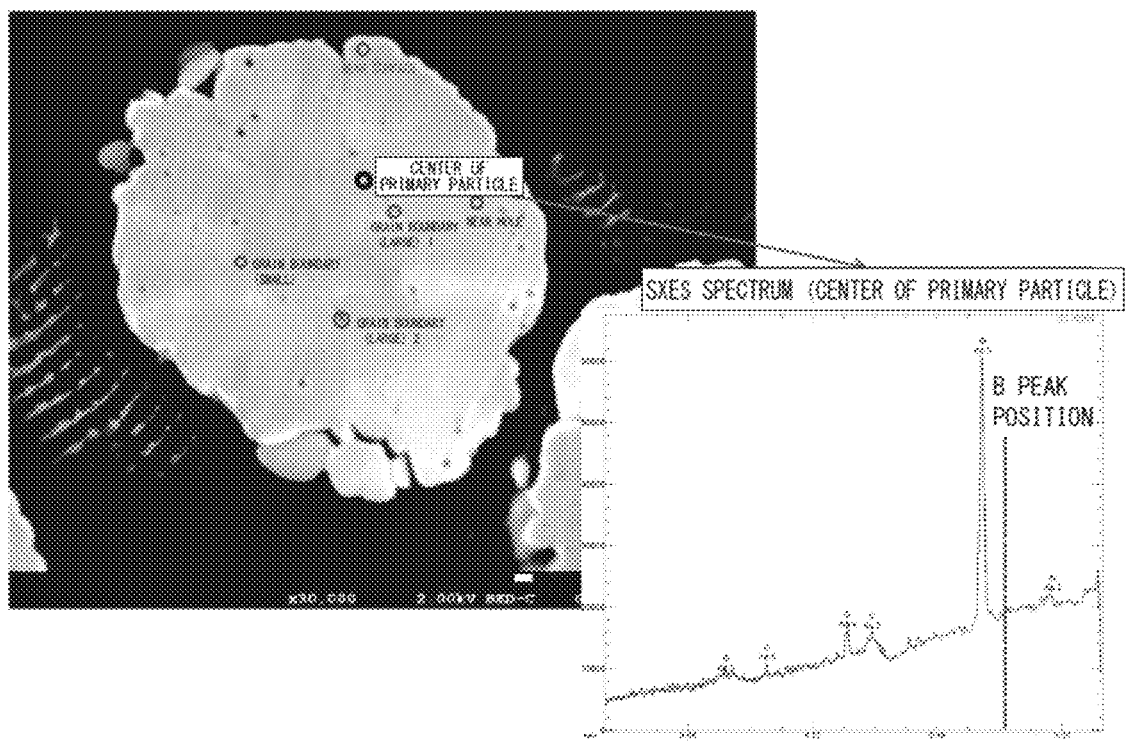
FIGS. 4(A) and 4(B) are photographs of an exemplary analysis result of the positive electrode active material of the present embodiment by soft X-ray emission spectroscopy.
Figure 4B:
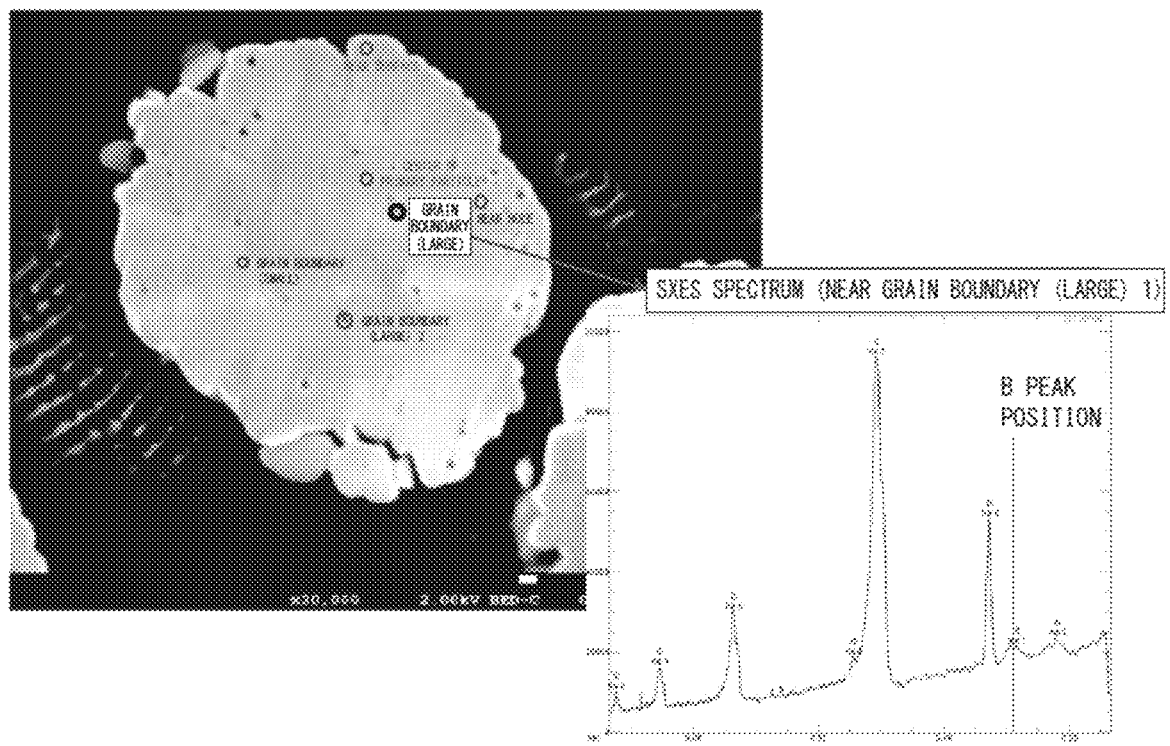

Table 1 lists the average particle diameter, the value of [d90–d10]/the average particle diameter], the average particle diameter of the primary particles, measurement results of the water-soluble Li, and the like of the obtained positive electrode active material. FIG. 3 shows an observation result of the positive electrode active material with a scanning electron microscope (SEM: JSM-6360LA manufactured by JEOL Ltd.). The obtained positive electrode active material was analyzed with XPS (VersaProbe II manufactured by Ulvac-Phi, Inc.), and a waveform indicating chemical combination with lithium was recognized at a boron peak, which revealed the presence of the lithium-boron compound on the surfaces of the primary particles. As to the presence of boron within the secondary particle, FIGS. 4(A) and 4(B) show examples of results analyzed with a soft X-ray emission spectroscopy (SXES) apparatus mounted on an FE-SEM. As shown in FIG. 4(A), at the central part of the primary particle, no clear peak of boron was observed, whereas as shown in FIG. 4(B), a peak indicating boron was observed at a grain boundary within the secondary particle (the surface of the primary particle), which revealed the presence of boron.

[Production of Battery]

Figure 6:
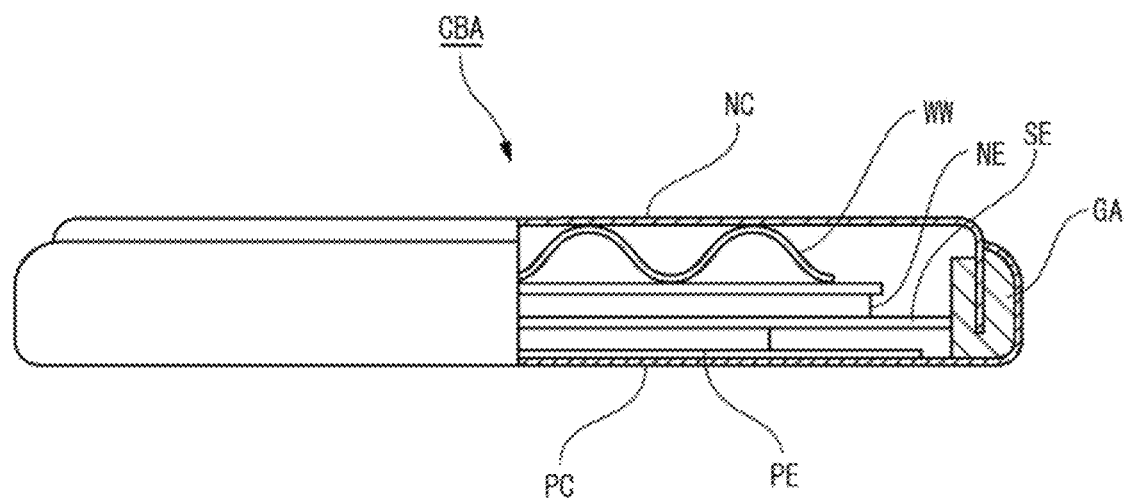
FIG. 6 is a schematic diagram of a coin-type battery used for evaluation.

Mixed together were 52.5 mg of the obtained positive electrode active material, 15 mg of acetylene black, and 7.5 mg of a polytetrafluoroethylene resin (PTFE), the resultant mixture was press-formed at a pressure of 100 MPa to a diameter of 11 mm and a thickness of 100 µm to form a positive electrode (an electrode for evaluation) PE illustrated in FIG. 6. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M $LiClO_4$ as a supporting electrolyte (manufactured by Tomiyama Pure Chemical Industries, Ltd.) was used. For a separator SE, a polyethylene porous film with a film thickness of 25 µm was used. The coin battery has a gasket GA and a wave washer WW, and the coin-type battery was assembled with a positive electrode can PC and a negative electrode can NC. Table 2 lists measurement results of the initial charging and discharging capacities and the positive electrode resistance value of the obtained positive electrode active material.

Example 2

A positive electrode active material was obtained and evaluated similarly to Example 1 except that the heat treatment temperature during the addition of boric acid was changed to 210° C. Table 1 and Table 2 list evaluation results.

Example 3

A positive electrode active material was obtained and evaluated similarly to Example 1 except that the heat treatment temperature during the addition of boric acid was changed to 290° C. Table 1 and Table 2 list evaluation results.

Example 4

A positive electrode active material was obtained and evaluated similarly to Example 1 except that orthoboric acid weighed so as to be t=0.02 in General Formula (1) indicating the active material after heat treatment was mixed with the lithium composite oxide particles. Table 1 and Table 2 list evaluation results.

Example 5

A positive electrode active material was obtained and evaluated similarly to Example 1 except that orthoboric acid weighed so as to be t=0.04 in General Formula (1) indicating the active material after heat treatment was mixed with the lithium composite oxide particles. Table 1 and Table 2 list evaluation results.

Comparative Example 1

A positive electrode active material was obtained and evaluated similarly to Example 1 except that no boric acid was added. Table 1 and Table 2 list evaluation results.

Comparative Example 2

A positive electrode active material was obtained and evaluated similarly to Example 1 except that the heat treatment temperature during the addition of boric acid was changed to 150° C. Table 1 and Table 2 list evaluation results. The obtained positive electrode active material was analyzed with XPS (VersaProbe II manufactured by Ulvac-Phi, Inc.), then no waveform indicating chemical combination with lithium was recognized at a boron peak. It is considered from this result that no boric acid compound containing lithium is formed.

Comparative Example 3

A positive electrode active material was obtained and evaluated similarly to Example 1 except that the heat treatment temperature during the addition of boric acid was changed to 350° C. Table 1 and Table 2 list evaluation results.

Comparative Example 4

A positive electrode active material was obtained and evaluated similarly to Example 1 except that orthoboric acid weighed so as to be t=0.015 in General Formula (1) indicating the active material after heat treatment was mixed with the lithium composite oxide particles. Table 1 and Table 2 list evaluation results.

Comparative Example 5

A positive electrode active material was obtained and evaluated similarly to Example 1 except that orthoboric acid weighed so as to be t=0.045 in General Formula (1) indicating the active material after heat treatment was mixed with the lithium composite oxide particles. Table 1 and Table 2 list evaluation results.

TABLE 1

| | Production condition | | Lithium-nickel-cobalt-manganese composite oxide | | | | | | Secondary particle | | | Primary | Primary particle surface | | |
|---|---|---|---|---|---|---|---|---|---|---|---|---|---|---|---|
| | Boron addition amount | Heat treatment temperature | Composition (entire) $Li_{1+s}Ni_xCo_yMn_zB_tO_{2+\beta}$ | | | | | | Average particle diameter | (d90 − d10)/ average particle diameter | | particle average diameter | LiB compound | Water-soluble Li amount | Li seat occupancy |
| | t | °C. | 1 + s | x | y | z | t | | µm | — | | nm | — | Times  % by mass | % |
| Example 1 | 0.03 | 250 | 1.07 | 0.38 | 0.32 | 0.3 | 0.03 | | 5.8 | 0.45 | | 510 | Pass | 1.17  0.084 | 96.9 |
| Example 2 | 0.03 | 210 | 1.07 | 0.38 | 0.32 | 0.3 | 0.03 | | 5.7 | 0.43 | | 500 | Pass | 1.12  0.081 | 97.4 |

TABLE 1-continued

Lithium-nickel-cobalt-manganese composite oxide

| | Production condition | | Composition (entire) Li$_{1+s}$Ni$_x$Co$_y$Mn$_z$B$_t$O$_{2+\beta}$ | | | | Secondary particle | | Primary | Primary particle surface | | | |
|---|---|---|---|---|---|---|---|---|---|---|---|---|---|
| | Boron addition amount | Heat treatment temperature | | | | | Average particle diameter | (d90 − d10)/ average particle diameter | particle average diameter | LiB compound | Water-soluble Li amount | | Li seat occupancy |
| | t | °C. | 1 + s | x | y | z | t | μm | — | nm | — | Times | % by mass | % |
| Example 3 | 0.03 | 290 | 1.07 | 0.38 | 0.32 | 0.3 | 0.03 | 6 | 0.44 | 510 | Pass | 1.22 | 0.088 | 96.7 |
| Example 4 | 0.02 | 250 | 1.07 | 0.38 | 0.32 | 0.3 | 0.02 | 5.9 | 0.43 | 470 | Pass | 1.16 | 0.083 | 97.1 |
| Example 5 | 0.04 | 250 | 1.07 | 0.38 | 0.32 | 0.3 | 0.04 | 5.8 | 0.44 | 490 | Pass | 1.2 | 0.089 | 96.7 |
| Comparative Example 1 | — | — | 1.07 | 0.38 | 0.32 | 0.3 | — | 6.1 | 0.45 | 490 | — | 1 | 0.072 | 98.0 |
| Comparative Example 2 | 0.03 | 150 | 1.07 | 0.38 | 0.32 | 0.3 | 0.03 | 5.8 | 0.45 | 500 | Fail | 1.08 | 0.078 | 97.7 |
| Comparative Example 3 | 0.03 | 350 | 1.07 | 0.38 | 0.32 | 0.3 | 0.03 | 5.8 | 0.43 | 510 | — | 1.73 | 0.125 | 96.2 |
| Comparative Example 4 | 0.015 | 250 | 1.07 | 0.38 | 0.32 | 0.3 | 0.015 | 5.7 | 0.44 | 460 | — | 1.11 | 0.08 | 97.3 |
| Comparative Example 5 | 0.045 | 250 | 1.07 | 0.38 | 0.32 | 0.3 | 0.045 | 5.8 | 0.44 | 520 | — | 1.52 | 0.113 | 96.0 |

TABLE 2

| | Paste Gelation evaluation | Secondary battery Initial discharging capacity mAh × g$^{-1}$ | Positive electrode resistance Ω/cm$^2$ |
|---|---|---|---|
| Example 1 | Pass | 165.5 | 0.98 |
| Example 2 | Pass | 165.9 | 1.01 |
| Example 3 | Pass | 165.3 | 0.96 |
| Example 4 | Pass | 164.9 | 1.04 |
| Example 5 | Pass | 166.5 | 0.96 |
| Comparative Example 1 | Fail | 162.4 | 1.22 |
| Comparative Example 2 | Fail | 162.6 | 1.2 |
| Comparative Example 3 | Fail | 161.9 | 0.97 |
| Comparative Example 4 | Fail | 162.8 | 1.16 |
| Comparative Example 5 | Fail | 162.2 | 0.99 |

(Evaluation Results)

The positive electrode active materials obtained in the examples all reduce the positive electrode resistance and obtain higher battery capacity compared with the positive electrode active material of Comparative Example 1, which does not contain boron, when used for the positive electrode of the secondary battery. The positive electrode active materials obtained in the examples all inhibit gelation of the paste.

FIGS. 5(A), 5(B) and 5(C) are graphs of evaluation/measurement results about the initial discharging capacity (A), the positive electrode resistance (B), and the water-soluble Li amount (C) of Examples 1, 4, and 5 and Comparative Examples 1, 4, and 5, which were produced with the same condition except the addition amount of the boron raw material. As illustrated in FIGS. 5(A), 5(B) and 5(C), when the addition amount of boron is small (Comparative Examples 1 and 2), a reduction in the positive electrode resistance is less, and gelation of slurry occurs. In contrast, when the addition amount of boron is extremely large (Comparative Example 5), the water-soluble lithium amount is large, and gelation of slurry occurs, although a reduction in the positive electrode resistance is recognized. In addition, when the addition amount of boron is large, the amount of lithium extracted from the lithium-nickel-cobalt-manganese composite oxide is large, which reduces the Li seat occupancy and reduces the initial discharging capacity.

In the positive electrode active material obtained in Comparative Example 2 (the heat treatment temperature: 150° C.), no lithium-boron compound was recognized on the primary particles on the surface of the secondary particle, and gelation of slurry occurs. In the positive electrode active material obtained in Comparative Example 3 (the heat treatment temperature: 350° C.), an increase in the water-soluble Li amount and gelation of slurry are recognized. Furthermore, the heat treatment temperature is high, and the amount of lithium extracted from the lithium-nickel-cobalt-manganese composite oxide is large, which reduces the Li seat occupancy and reduces the initial discharging capacity. It is revealed from the foregoing results that the positive electrode active material of the present embodiment with the heat treatment temperature and the addition amount of the boron raw material set to appropriate ranges can achieve both favorable output characteristics and high battery capacity and inhibition of gelation of the paste during electrode production.

INDUSTRIAL APPLICABILITY

The nonaqueous secondary battery containing the positive electrode active material of the present embodiment shows such excellent electric characteristics as high output and high battery capacity and can thus be suitably used as a small-sized secondary battery to be mounted on portable electronic devices such as cellular phones and notebook personal computers, power tools, and the like.

The technical scope of the present invention is not limited to the aspects described in the embodiment and the like. One or more of the requirements described in the embodiment and the like may be omitted. The requirements described in the embodiment and the like can be combined as appropriate. Japanese Patent Application No. 2016-178217 and all the literature cited in this specification are herein incorporated by reference in their entirety to the extent allowed by law.

DESCRIPTION OF REFERENCE SIGNS

10 Positive electrode active material
1 Lithium-metal composite oxide
2 Primary particle
3 Secondary particle
4 Lithium-boron compound
5 Hollow part
PE Positive electrode (electrode for evaluation)
NE Negative electrode
SE Separator
GA Gasket
WW Wave washer
PC Positive electrode can
NC Negative electrode can

The invention claimed is:

1. A positive electrode active material for a nonaqueous electrolyte secondary battery, the positive electrode active material comprising:
a lithium-nickel-cobalt-manganese composite oxide represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \leq s \leq 0.20$, $0.1 \leq x \leq 0.5$, $0.1 \leq y \leq 0.5$, $0.1 \leq z \leq 0.5$, $x+y+z+u=1$, $0.025 \leq t \leq 0.04$, $0 \leq u \leq 0.1$, and $0 \leq \beta \leq 0.5$) and having a hexagonal layered crystal structure, wherein
the lithium-nickel-cobalt-manganese composite oxide contains a secondary particle formed of a plurality of flocculated primary particles and a boron compound containing lithium present at least on part of surfaces of the primary particles, and
a water-soluble Li amount present on the surfaces of the primary particles is up to 0.1% by mass relative to an entire amount of the positive electrode active material.

2. The positive electrode active material for a nonaqueous electrolyte secondary battery according to claim 1, wherein the positive electrode active material has an average particle diameter of at least 3 μm and up to 20 μm.

3. The positive electrode active material for a nonaqueous electrolyte secondary battery according to claim 1, wherein the primary particles have an average particle diameter of at least 0.2 μm and up to 1.0 μm.

4. The positive electrode active material for a nonaqueous electrolyte secondary battery according to claim 1, wherein [(d90−d10)/(an average particle diameter)] as an indicator indicating a spread of particle size distribution of the positive electrode active material is up to 0.60.

5. The positive electrode active material for a nonaqueous electrolyte secondary battery according to claim 1, wherein the secondary particle has a hollow structure having a hollow part therewithin.

6. A method for producing a positive electrode active material for a nonaqueous electrolyte secondary battery, the positive electrode active material comprising a lithium-nickel-cobalt-manganese composite oxide represented by General Formula (1): $Li_{1+s}Ni_xCo_yMn_zB_tM1_uO_{2+\beta}$ (in Formula (1), M1 is an element other than Li, Ni, Co, Mn, and B; and $-0.05 \leq s \leq 0.20$, $0.1 \leq x \leq 0.5$, $0.1 \leq y \leq 0.5$, $0.1 \leq z \leq 0.5$, $x+y+z+u=1$, $0.025 \leq t \leq 0.04$, $0 \leq u \leq 0.1$, and $0 \leq \beta \leq 0.5$) and having a hexagonal layered crystal structure, the method comprising:
obtaining nickel-cobalt-manganese composite hydroxide particles represented by General Formula (2): $Ni_xCo_yMn_zM2_u(OH)_{2+\alpha}$ (in Formula (2), M2 is an element other than Li, Ni, Co, and Mn; $0.1 \leq x \leq 0.5$, $0.1 \leq y \leq 0.5$, $0.1 \leq z \leq 0.5$, $x+y+z+u=1$, $0 \leq u \leq 0.1$, and $0 \leq \alpha \leq 0.5$) by crystallization;
mixing a lithium compound with the nickel-cobalt-manganese composite hydroxide particles such that a ratio of number of atoms of lithium to a sum of numbers of atoms of metal elements other than lithium is at least 0.95 and up to 1.20 to obtain a lithium mixture;
firing the lithium mixture while being held in an oxidative atmosphere at a temperature of at least 800° C. and up to 1,000° C. for at least 5 hours and up to 20 hours to obtain lithium-nickel-cobalt-manganese composite oxide particles formed of a secondary particle formed of a plurality of flocculated primary particles;
mixing the lithium-nickel-cobalt-manganese composite oxide particles and a boron raw material together to obtain a boron mixture; and
thermally treating the boron mixture in an oxidative atmosphere at a temperature of at least 200° C. and up to 300° C. to form a boron compound containing lithium present at least on part of surfaces of the primary particles, wherein
at the thermally treating, thermal treatment is performed such that a water-soluble Li amount present on the surfaces of the primary particles after the thermal treatment is up to 0.1% by mass relative to an entire amount of the positive electrode active material.

7. The method for producing a positive electrode active material for a nonaqueous electrolyte secondary battery according to claim 6, wherein the boron raw material is at least one of boron oxide and an oxoacid of boron.

8. The method for producing a positive electrode active material for a nonaqueous electrolyte secondary battery according to claim 7, wherein the boron raw material is orthoboric acid.

9. The method for producing a positive electrode active material for a nonaqueous electrolyte secondary battery according to claim 6, further comprising crushing the lithium-nickel-cobalt-manganese composite oxide particles obtained at the firing.

10. A nonaqueous electrolyte secondary battery comprising:
a positive electrode;
a negative electrode;
a separator; and
a nonaqueous electrolyte,
the positive electrode containing the positive electrode active material for a nonaqueous electrolyte secondary battery according to claim 1.

11. The method for producing the positive electrode active material for the nonaqueous electrolyte secondary battery according to claim 6, wherein at the thermally treating, the thermal treatment is performed such that the water-soluble Li amount present on surfaces of the primary particles after the thermal treatment is up to 1.3 times the amount before the thermal treatment.

* * * * *